United States Patent [19]
Rentschler et al.

[11] Patent Number: 5,352,276
[45] Date of Patent: Oct. 4, 1994

[54] WATER REMEDIATION

[75] Inventors: Dennis Rentschler, Wilton; Steven Szabo, Nashua, both of N.H.; Paul Farrow, Concord, MA; Gary R. Powers, Weare; Jeffrey H. Gerade, Peter, both of N.H.

[73] Assignee: Sippican, Inc., Marion, Mass.

[21] Appl. No.: 107,837

[22] PCT Filed: Feb. 26, 1992

[86] PCT No.: PCT/US92/01241
§ 371 Date: Aug. 26, 1993
§ 102(e) Date: Aug. 26, 1993

[87] PCT Pub. No.: WO92/14533
PCT Pub. Date: Sep. 3, 1992

Related U.S. Application Data

[63] Continuation-in-part of Ser. No. 661,403, Feb. 26, 1991, abandoned.

[51] Int. Cl.$^5$ .............................................. B01D 19/00
[52] U.S. Cl. ........................................ 95/246; 95/247; 95/263; 95/266; 96/189; 96/198; 96/202; 261/114.1
[58] Field of Search .................. 55/240, 244, 245–247, 55/263–266; 96/189, 193, 197, 198, 202; 261/113, 114.1, 114.5

[56] References Cited

U.S. PATENT DOCUMENTS

| | | | |
|---|---|---|---|
| 243,297 | 6/1881 | Perin | 261/114.1 |
| 791,168 | 5/1905 | Stickle | 261/114.1 X |
| 1,419,867 | 6/1922 | Laird | 261/113 |
| 1,442,414 | 1/1923 | Rose | 261/113 |
| 1,608,416 | 11/1926 | Newton | 261/114.1 |

(List continued on next page.)

FOREIGN PATENT DOCUMENTS

| | | | |
|---|---|---|---|
| 0347576 | 12/1989 | European Pat. Off. | 55/196 |
| 86168 | 12/1971 | Fed. Rep. of Germany | 261/114.5 |
| WO90/03945 | 4/1990 | PCT Int'l Appl. | |

OTHER PUBLICATIONS

The Shallow Tray Aeration Systems Advertisement (North East Environemental Products, Inc.) undated.
The Multi-Staged Diffused Bubble Aeration System Advertisement (Lowry Engineering, Inc.) undated.
The Cascade Air Stripper Advertisement (ESI, Inc.) undated.
Perry, John H., *Chemical Engineers' Handbook*, pp. (18-3)-(18-8), (18-25)-(18-27), 1963.
Smith, Buford D., *Design of Equilibrium Stage Processes*, pp. 500–501, 1963.
Pollution Equipment News, pp. 27–28, Aug. 1990.

*Primary Examiner*—Robert Spitzer
*Attorney, Agent, or Firm*—Banner, Birch, McKie & Beckett

[57] ABSTRACT

A portable modular water air stripper system for remediation of contaminated water, such as groundwater at an outdoor contamination site, has its primary components, including the frames of a vertical assembly of individually demountable tray units, a sump and cap member, formed as hollow rotationally molded plastic pieces. Each tray unit has an air-porous sheet member having air-flow apertures with a diameter of 0.100 inches or less constructed to retain water during stripping action by air passing upwardly through the apertures. Each sheet member is removable from a respective tray frame and has mounted thereon a baffle that defines a tortuous water flow path across each tray. In one embodiment, the baffles extend between and are substantially sealed to the undersurface of the next higher tray. According to another feature, a transfer duct is arranged to guide the least contaminated groundwater downwards and laterally to a position in the next lowest tray unit whereby the water will contact the most contaminated air of the next lowest tray unit. In a further embodiment, a vacuum pump for drawing stripping air through the system is mounted on the sump within a protective enclosure which also covers an air inlet provided in the sump through which stripping air is drawn.

72 Claims, 13 Drawing Sheets

U.S. PATENT DOCUMENTS

| | | | |
|---|---|---|---|
| 1,725,925 | 8/1929 | Kent | 261/122 |
| 1,738,870 | 12/1929 | Cox et al. | 261/114.1 X |
| 2,315,190 | 3/1943 | Eberhardt | 261/114.1 |
| 2,327,993 | 8/1943 | Bragg | 261/114.1 |
| 2,500,934 | 3/1950 | Dean | 261/114.1 |
| 2,666,737 | 1/1954 | Hurd | 261/114.1 X |
| 2,747,849 | 5/1956 | Colburn et al. | 261/114.1 |
| 2,865,617 | 12/1958 | Dickens et al. | 261/9 |
| 2,926,754 | 3/1960 | Ragatz | 55/196 X |
| 2,976,026 | 3/1961 | Aguirre | 261/114.1 X |
| 3,064,955 | 11/1962 | Boutte | 261/113 |
| 3,364,124 | 1/1968 | Walker et al. | 202/158 |
| 3,410,540 | 11/1968 | Bruckert | 261/113 |
| 3,434,701 | 3/1969 | Bauer | 261/114.1 X |
| 3,445,094 | 5/1969 | Shobe | 261/114 |
| 3,679,053 | 7/1972 | Koulovatos et al. | 210/86 |
| 3,814,397 | 6/1974 | Geist et al. | 261/114.1 |
| 3,853,513 | 12/1974 | Carson | 55/185 |
| 3,928,513 | 12/1975 | Leva | 261/114.5 X |
| 3,997,303 | 12/1976 | Newton | 55/97 |
| 4,028,191 | 6/1977 | Scott | 261/114.1 X |
| 4,036,917 | 7/1977 | Slobodyanik | 261/114 JP |
| 4,132,761 | 1/1979 | Mix | 261/114.1 X |
| 4,150,957 | 4/1979 | Josis | 55/53 |
| 4,236,973 | 12/1980 | Robbins | 203/10 |
| 4,265,167 | 5/1981 | Mojonnier et al. | 55/196 X |
| 4,358,296 | 11/1982 | Notardonato et al. | 55/188 X |
| 4,391,675 | 7/1983 | Lynn et al. | 261/114.1 X |
| 4,396,463 | 8/1983 | Josis et al. | 203/10 |
| 4,412,924 | 11/1983 | Feather | 210/744 |
| 4,550,000 | 10/1985 | Bentham | 261/114 R |
| 4,556,522 | 12/1985 | Wilson | 261/114.1 |
| 4,564,447 | 1/1986 | Tiedmann | 55/196 X |
| 4,608,163 | 8/1986 | Yohe et al. | 210/150 |
| 4,663,089 | 5/1987 | Lowry et al. | 261/23.1 |
| 4,869,832 | 9/1989 | Lamarre | 210/747 |
| 4,872,955 | 10/1989 | Parker et al. | 261/114.1 X |
| 4,892,664 | 1/1990 | Miller | 55/196 X |
| 4,906,338 | 3/1990 | DeLoach | 203/10 |
| 5,045,215 | 9/1991 | Lamarre | 210/747 |

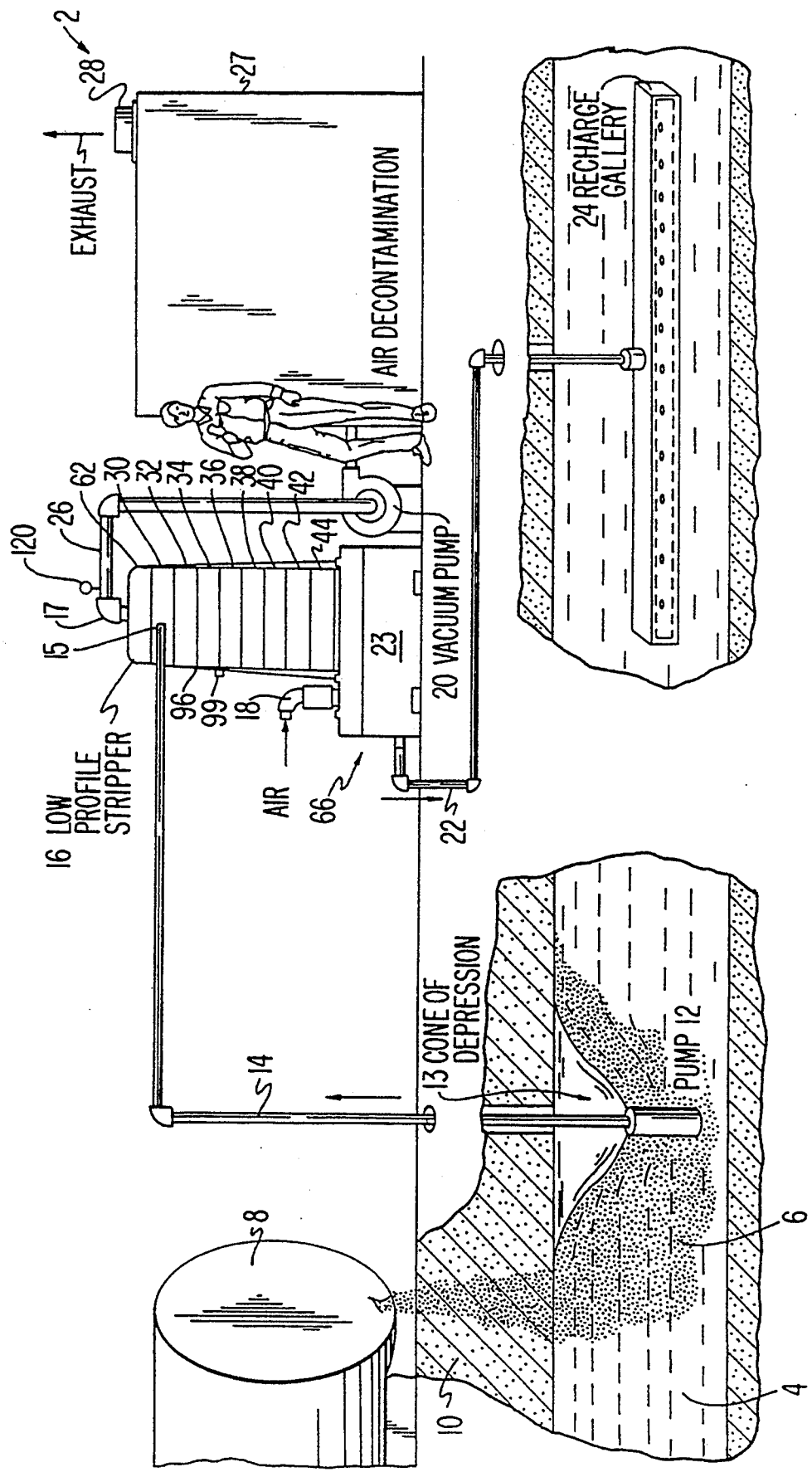

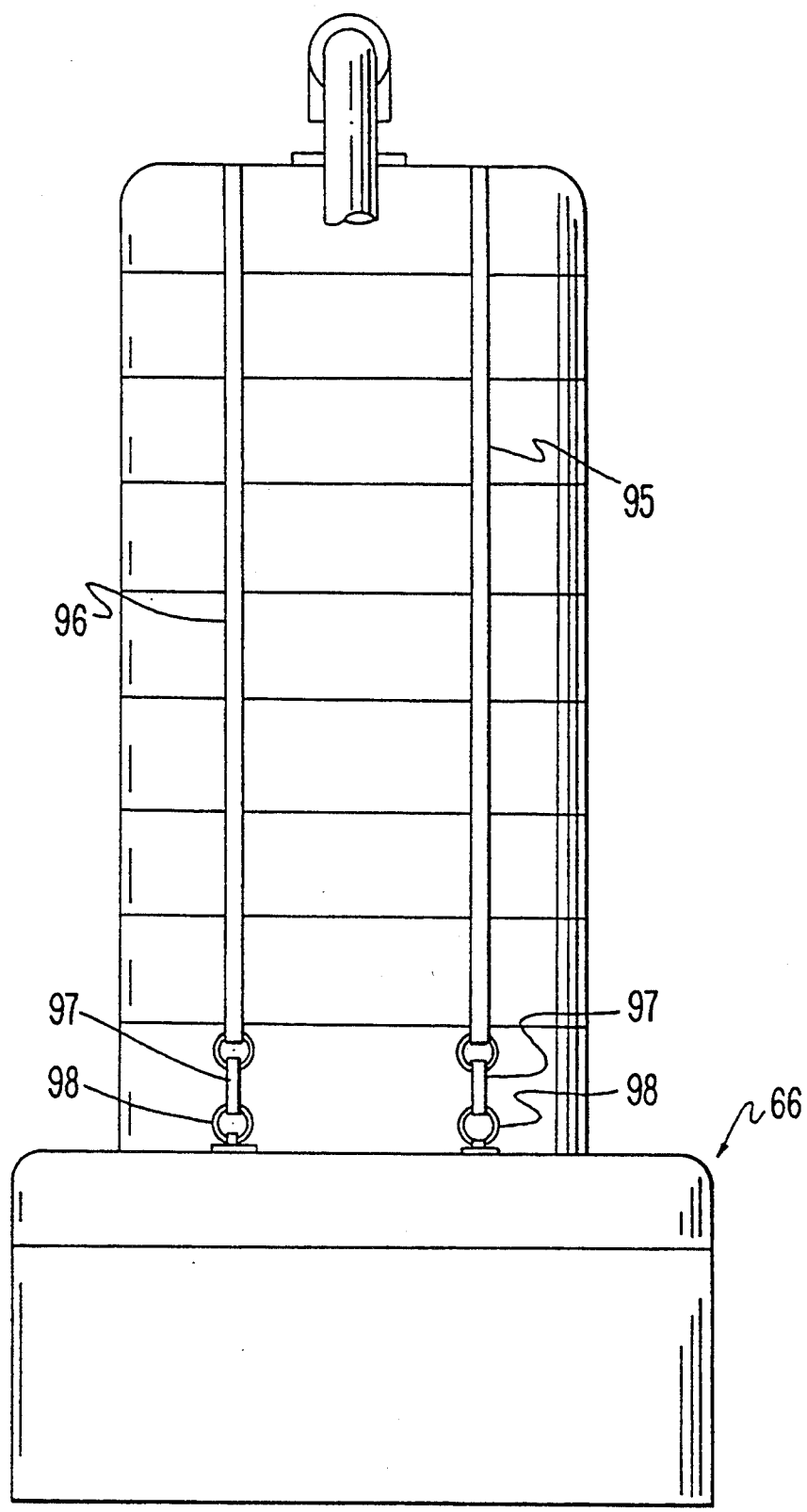

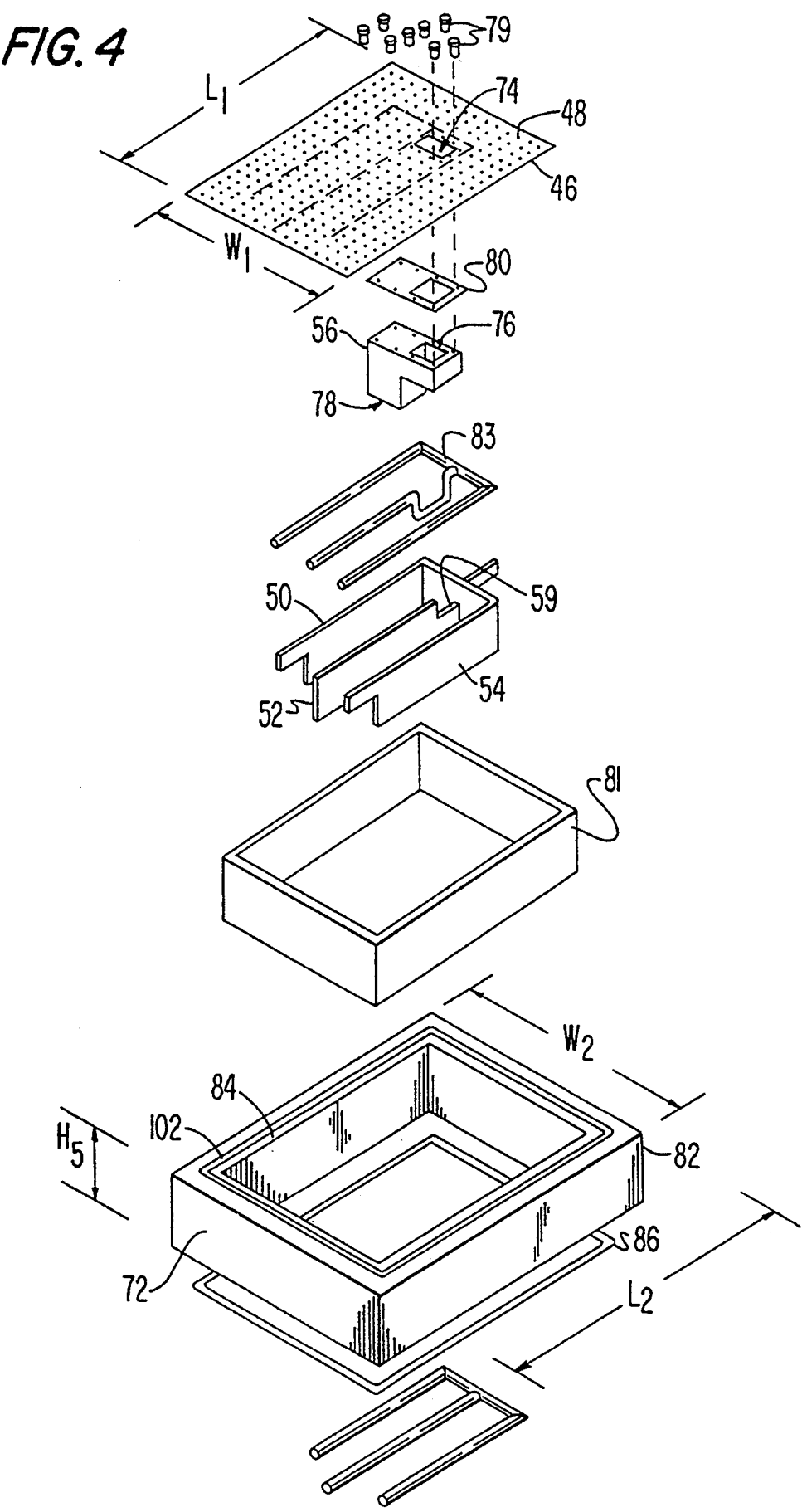

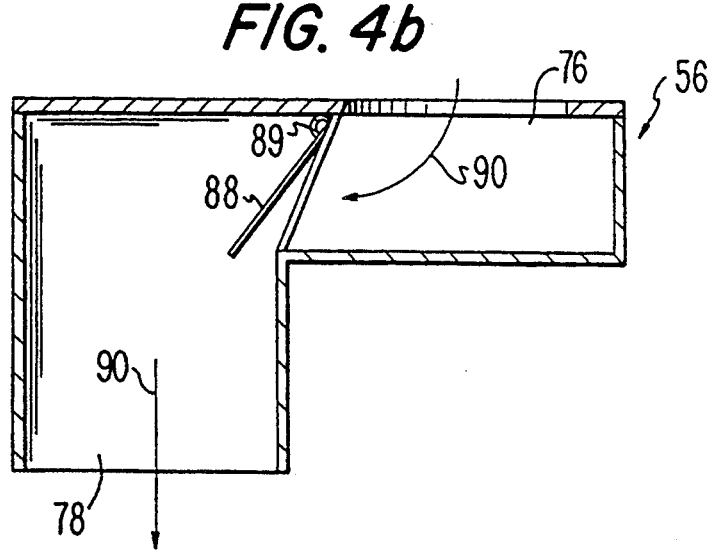
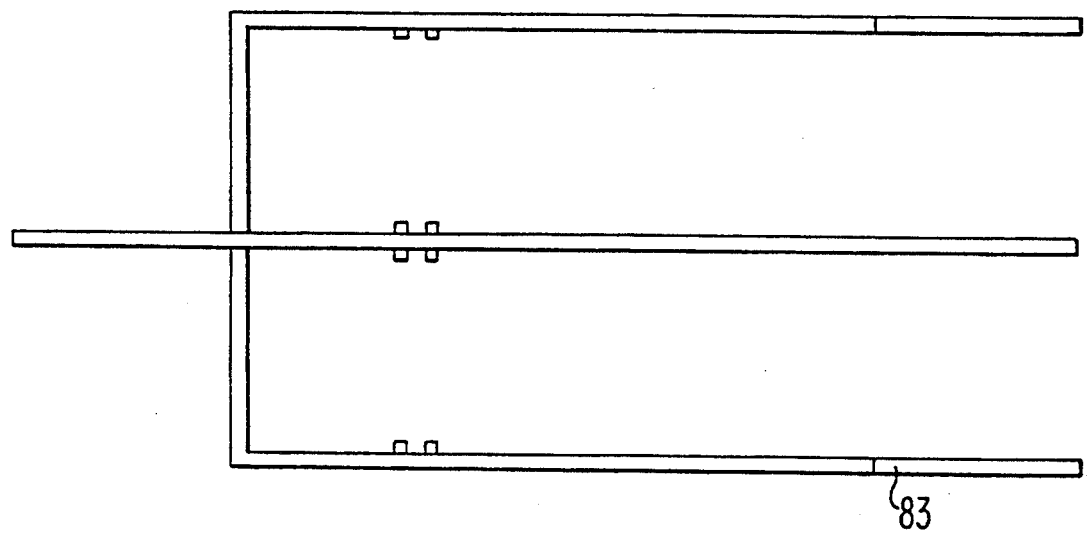
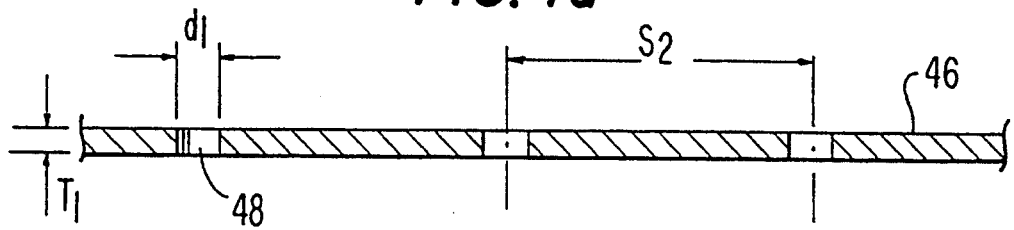

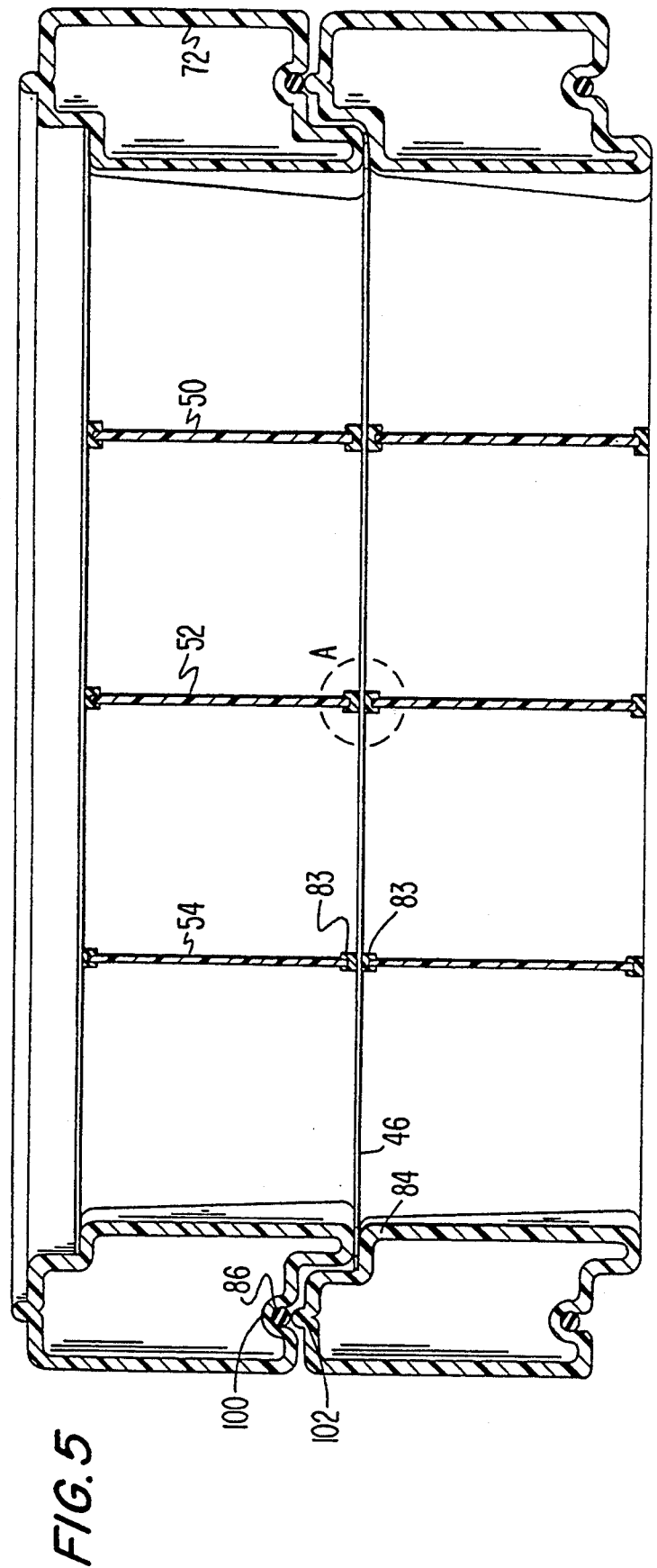
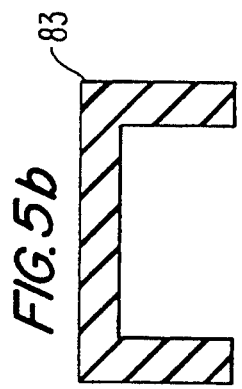
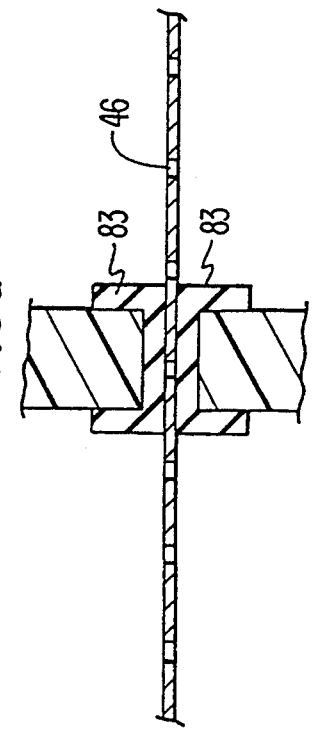

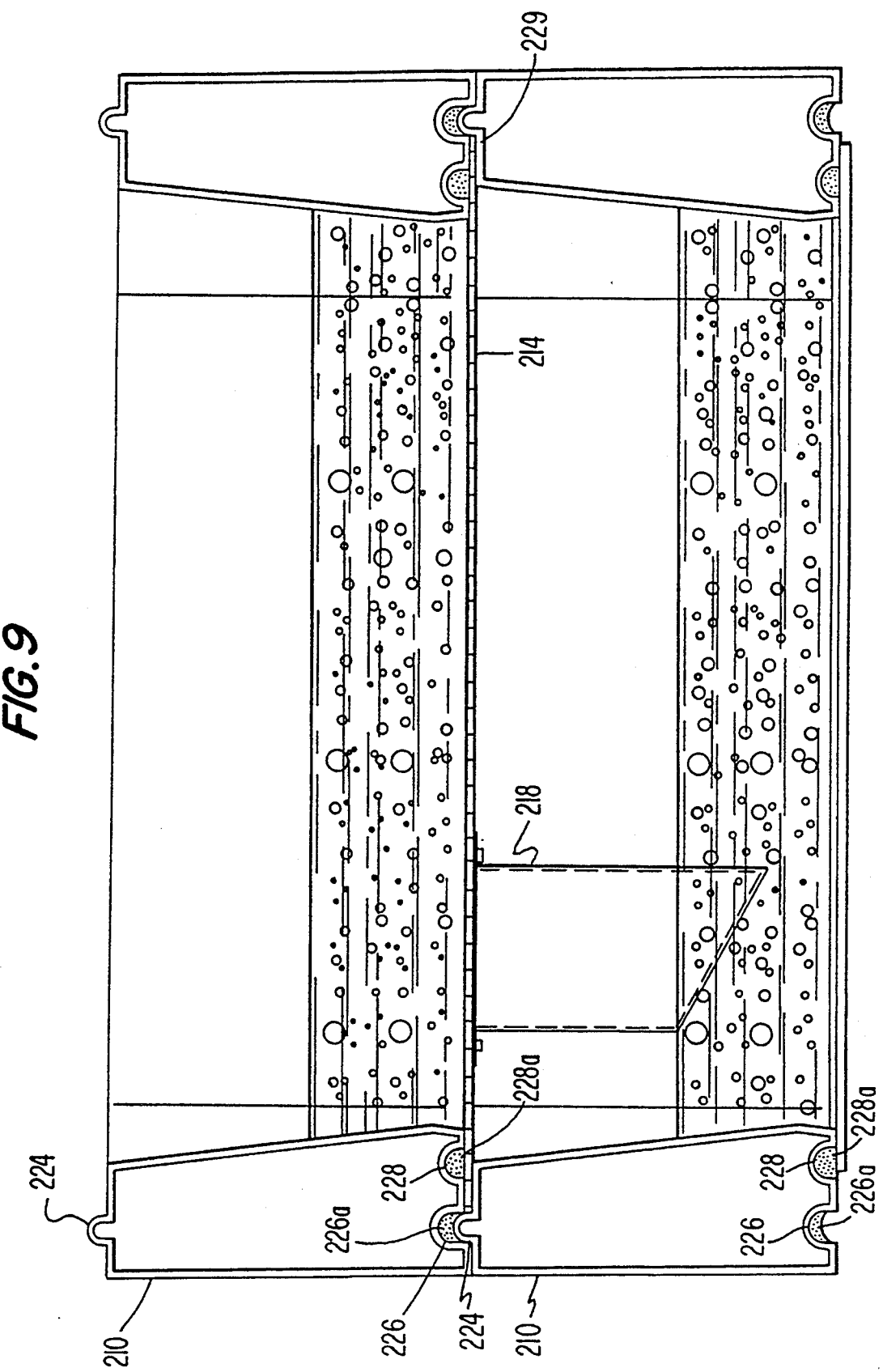

WATER REMEDIATION

This application is a continuation-in-pan of U.S. application Ser. No. 07/661,403, filed Feb. 26, 1991, now abandoned.

FIELD OF THE INVENTION

This invention relates to water remediation. More particularly, the invention relates to a portable, modular stripping system usable to treat contaminate water on site, and an associated method of use.

BACKGROUND OF THE INVENTION

Remediation of contaminated water, such as hydrocarbon-contaminated groundwater which is the subject of an environmental clean-up project, can be achieved with an air stripper system, including a vertical stripping tower, installed temporarily at the site. The contaminated water is introduced to the top of the tower and caused to flow downwardly by force of gravity, while stripper air is introduced from the bottom of the tower and caused to flow upward. The mixing of water and air that occurs during this countercurrent flow results in the transfer of the contaminants from the water to the airstream. Relatively clean water collects at the bottom of the tower which can be re-used, e.g., re-introduced to the ground. The contaminated airstream exits the top of the tower and is typically treated to remove the contaminants prior to emission of the air to the atmosphere. The degree to which the contaminants are removed from the water is dependent upon tactors such as the height of the stripper tower and the volume of stripper air passed through the tower. In general, an increase in decontamination effectiveness is achieved by increasing tower height and air flow volume. The economics of such remediation and the difficulties of maintenance of units at remote locations are of important concern, as are esthetics in many instances.

SUMMARY OF THE INVENTION

The invention provides a low physical profile remediation system having a compact, modular air stripping unit that enables easy servicing and low-cost operation, and which is aesthetically more pleasing than high towers. One aspect of the invention comprises a water air stripper system usable to treat contaminated water such as at an outdoor site in residential areas near filling stations. the air stripper system usable with a blower arranged to cause air flow upwardly through the stripper unit, the water air stripper system comprising a vertical assembly of limited vertical height of a series of individually demountable tray units mounted above one another, the bottom of each tray unit comprised of air-porous medium defined by a sheet member having air-flow apertures, the apertures having a diameter of about 0.100 inch or less to prevent the flow of water therethrough at zero or minimal airflow through the apertures under conditions of equality between the head of water in the tray above the aperture and the opposing pressure differential of the air below and above the respective tray, each tray constructed to retain water for a period of time during stripping action caused by air passing upwardly through the apertures, water entry means and exit means respectively at the top and bottom of the water air stripper system, and water-flow guiding means to guide the water at a relatively shallow depth over each stage of air-porous media, thence downwards to the next stage; and air inlet and outlet conduits respectively at the bottom and top of the unit.

Another aspect of the invention comprises a water air stripper unit usable to treat contaminated water at a remediation site, the stripper unit comprising a vertically-extending interfitting nest of demountable tray frames, each tray frame having a porous bottom member which is removable from the frame and an internal baffle that defines a tortuous water flow path laterally across the bottom member of each tray, the baffles extending respectively between and substantially sealed to, the undersurface of the next above tray bottom member and the upper surface of the tray bottom member in which the baffle resides.

Another aspect of the invention comprises a water air stripping unit usable to treat contaminated water at a remediation site, the stripper unit comprising a vertical assembly of limited vertical height of a series of individually demountable tray units, and a transfer duct extending from each of most of the tray units downwards, the transfer duct arranged to guide the least contaminated groundwater in its respective tray unit to flow downwards and laterally to a position in the next lowest tray unit whereby the water will contact the most contaminated air of the next lowest tray unit.

The water-flow guiding means may comprise a transfer duct arranged to guide the least contaminated groundwater of a said tray unit to flow downwards to a position in the next lowest tray unit such that the water entering the next lowest tray unit will contact the most contaminated air passing through said next lowest tray unit, preferably, substantially all the tray units being provided with such a transfer duct, so aged. Each transfer duct may include a check valve to prevent air flow therethrough during start-up. Baffle means may be sealed to the top and bottom surfaces of successive tray bottoms in a manner to isolate airstreams passing through regions of water in a tray unit that have different levels of contaminants. The baffle means defines a path for the flow of water laterally in the tray unit, the path determining the residence time in the unit of water entering the unit, in a flow of continually decreasing contamination from the point of entry to the point of exit of the unit.

The patterns of the baffle means of the successive units may be positioned substantially identically above one another, with the water guided from tray unit to unit such that the water proceeds progressively in repeated fashion through the same pattern of airstreams as it progressively releases its contaminants during its course of lateral travel through each of the series of units. The vertically arranged series of baffle means may provide adjacent vertical columns for the flow of stripper air, the columns arranged to maintain, throughout the series of tray units, at any lateral position in the water flow path, a substantially consistent ratio of contamination concentration of the air and the water through which it passes.

An air stripper unit with some or all of the above features may be arranged in combination with a volatilized contaminant removal device connected to receive contaminated air from the air stripper unit and an air blower arranged to cause air flow upwardly from the stripper unit, the volatilized contaminant removal unit constructed and arranged to remove volatilized water contaminants stripped from the water and carried by the air as it moves through the water stripping unit, preferably the volatilized contaminant removal device comprises a preheater and an oxidation unit or an absorbent or adsorbent.

Also, a preferred embodiment of the system is constructed to decontaminate water at a flow rate of about 20 gpm; the system is constructed for an air flow rate of about 250 CFM or less; the air is drawn into the stripper unit from a blower or vacuum pump, the intake of which is connected to the top of the stripper unit; the air flow volume of the stripper air is variable over a range of about 20 to 1; the air porous medium is removable and disposable; the air-porous medium has openings of about 0.050 inch; the air porous medium is a thin, flexible sheet of thickness 0.06 inch or less; the air-porous medium has an open area in the range of 2 to 9%, most preferably about 4 or 5%; the assembly of tray units may be arranged such that the size of the openings decreases in successive tray units from the top of the stripper unit; the stripper tray units have an area of less than about 1000 in$^2$; the tray units have peripheral frames formed of rotationally molded plastic; the sump is formed of rotationally molded plastic; and the stripper tray units have a vertical height of about six inches; the air stripper comprises at least five of said tray units, most preferably six to ten of the tray units; and the stripper has a vertical height of about nine feet or less.

Another aspect of the invention comprises a method of treating contaminated water having the following steps. Contaminated water is pumped to an elevated position. The water is directed to flow laterally across and downwardly through a series of substantially horizontal trays sealed to each other to form a stripping apparatus. Air is drawn upwardly through the stripping apparatus, while the water flows downwardly from tray to tray through downcomers and laterally across a perforated area of the trays, in such a manner that the air passes through apertures of the perforated area having a diameter of about 0.100 inch or less and through the water as it flows laterally across each tray, whereby contaminants in the water are transferred to the air flowing upwardly with substantially no water seepage through the apertures. Air is exhausted from the stripping apparatus for subsequent treatment. Finally, decontaminated water which is passed through the stripping apparatus is directed to flow to a predetermined storage location.

In another aspect, the invention resides in a portable modular stripper system usable to treat contaminated water on site. The stripper system has a plurality of individually demountable and interchangeable tray units stacked one on top of another to form a stripping column. Each tray unit comprises a hollow plastic molded tray frame, a sheet member having air-flow apertures, a baffle defining a lateral water flow path across each sheet member, a transfer duct or downcomer arranged to guide water through the sheet member after having traversed the lateral water flow path, and sealing means for creating an air and water tight seal between adjacent tray frames when the tray units are stacked to form the stripping unit. Water entry and exit means are provided at upper and lower ends of the stripping unit, respectively, for providing water flow through the stripping unit. Air entry and exit means are provided at the lower and upper ends, respectively, for providing an air flow through the water flowing in the stripping unit.

Another aspect of the invention comprises a liquid remediation apparatus for stripping contaminants from a liquid via air flow. The apparatus comprises a plurality of individually demountable tray units stackable vertically one on top of another to form a stripping column. Each tray unit comprises a sheet member having air-flow apertures (a perforated area), and a baffle defining a lateral water flow path across the sheet member of each tray unit. The lowermost tray unit may be sealably secured to a sump for storing decontaminated water passed through the stripper unit. A vacuum pump is mounted on the sump for drawing air through the stripper unit. Finally, enclosure means are mounted on the sump for enclosing the vacuum pump and coveting an air inlet in the sump for drawing air from within the enclosure means through the stripping unit. The enclosure means has a first passageway for allowing air to enter the enclosure means and a second passageway for exhausting air from the vacuum pump. The air drawn into the stripper unit initially passes over and cools the vacuum pump within the enclosure means.

The air stripper unit and method of the invention enhance the exposure of contaminated water to stripping air and increase efficiency of mass transfer from the water to the stripping air. Such operation enables the amount of stripping air to be kept in the same general range as occurs with tall counterflow packed towers, thus permitting low cost decontamination of the air before exhausting to the atmosphere. In general, the system, employing an air porous medium that does not rely on air flow to prevent the leakage of water downward through the bottoms of the tray unit, enables a wide range of ability to vary air flow and selection of a smaller and more economical unit for removal of volatilized contaminants from the stripper airstream. The air-porous medium is preferably an aperture plate. The apertures are sized such that under a stable condition, in which the pressure differential of the static air below the aperture and above the water in the stage approaches the pressure of the water column over the aperture, the surface tension of the water prevents leakage of water through the apertures, even when substantially no air is passing through the holes. To meet this design parameter the apertures are sized at a maximum of about 0.100 inch, preferably, about 0.050 inch. At aperture sizes larger than this, a substantial flow of air is generally required to minimize leakage through the aperture. Thus, the present invention enables varying the air flow over a wide range and enabling the air flow to be limited to the minimum required to achieve the desired water decontamination. Thus the invention allows using a lower flow rate capacity and therefore lower cost air decontamination system. In typical systems according to the invention, the air flow may be controlled over a range of 20 to 1. In some practical embodiments, because of the large pressure drop employed in the stripper unit, a relatively large high energy blower may be required. The air flow rate required, as discussed above, may be comparatively low, e.g., 100 cfm, enabling the use of a relatively small air decontamination unit. Where an oxidation unit is employed, the consumption of input energy in heating the air for combustion can be minimized. The overall energy consumption of the system therefore can be kept comparatively low. The cost of system maintenance likewise is greatly reduced by the low physical profile and the novel construction features of the invention.

The hollow rotationally molded plastic construction of the trays, cap member and sump of both the first and second illustrated embodiments provide a highly durable yet lightweight modular unit particularly suitable for easy setup and operation at remote sites. Assembly of the system is greatly facilitated by the fact that the tray frames are identical and completely interchangeable.

The system configuration can be varied to tailor operation to the requirements of a particular outdoor site, to provide a small (generally less than 8 or 9 feet tall), easily portable, adaptable decontamination system that satisfies the myriad of varying performance, maintenance, power and aesthetic requirements of decontamination of outdoor sites, which can vary both from site to site and at any particular site, over time. The modular construction of the stripper unit, and low physical profile provides for easy and economical replacement of the air-porous medium to allow selection of aperture size and percent open area, thus, tailoring the air flow to the specific conditions encountered i.e., actual on-site conditions of water flow, which may differ from estimates made before the system is installed. In addition, if higher percentage removal is required, more stages over a wide range of smaller increments can be employed. During use, if fouling of the air-porous medium occurs, the medium can be easily replaced or cleaned (e.g.. by flexing or washing the medium) by disassembly of the stage units. Furthermore, the novel construction enables complete maintenance to be performed at remote sites by a small crew, which may be only one man.

In the embodiment of FIGS. 6–10, since the vacuum pump is mounted to the sump and surrounded by an enclosure, transportation of the entire apparatus as a single unit is facilitated, and the advantage of vacuum pump cooling is obtained by drawing air through the pump enclosure. Also, the simplified baffle and transfer duct arrangement of the second embodiment has reduced manufacturing and maintenance costs as compared with the fast, while still obtaining excellent decontamination efficiencies.

Other features and advantages of the invention will be apparent and fully understood from the following detailed description of the preferred embodiments, taken in connection with the appended drawings.

BRIEF DESCRIPTION OF THE DRAWINGS

FIG. 1 is a perspective view of a first remediation system in use to treat contaminated water at an outdoor site; while FIG. 1a is a side view of the stripper unit.

FIG. 4 is an exploded view of a tray unit employed in the stripper of FIG. 2; FIG. 4a is an enlarged view of an air-porous medium; FIG. 4b is a cross-sectional view of a transfer duct, enabling water flow from one tray unit to its adjacent unit below; FIG. 4c illustrates a sealing member employed with the tray units.

FIG. 5 illustrates the coupling of adjacent tray units; FIG. 5a is an enlarged view of the gasket seals in circle A of FIG. 5; FIG. 5b is an enlarged view of a single seal, shown in FIG. 5.

FIG. 9 is a cross-sectional view illustrating two of the tray units shown in FIG. 8 assembled and coupled together.

DETAILED DESCRIPTION OF THE PREFERRED EMBODIMENTS

Structure and Operation

Figure 2:
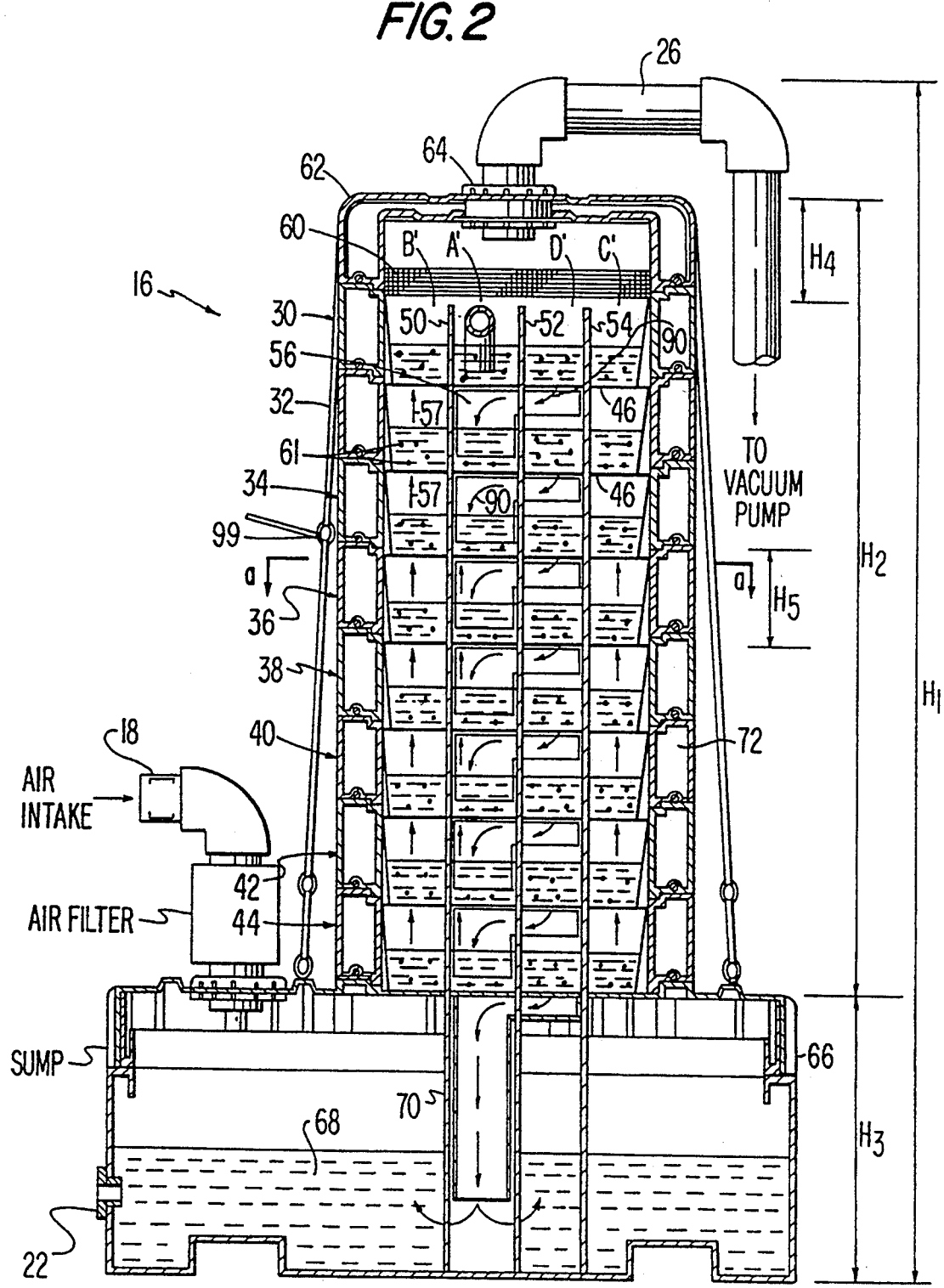
FIG. 2 is a cross-sectional view of a low physical profile air stripper unit, indicating the vertical flow of water and air.

Referring to FIG. 1, there is shown a low physical profile remediation system 2 at an outdoor site where groundwater 4 has been contaminated with organic contaminants 6 seeping from a storage tank 8 (which may be above ground, as shown, or below ground) through strata 10. The system 2 includes a pump 12 (e.g., 1 HP) immersed within the aquifer 4 to create a cone of depression 13 in the aquifer by rapid withdrawal of water (e.g., 20 gallons/minute) such that spread of the contaminant 6 is controlled and contaminant concentration is maximized in the area of the pump from which water is drawn for treatment. The contaminated water is passed through pipe conduits 14 (e.g., 1.5 inch diameter) to an inlet 15 near the top of a vertical, low physical provide air stripper apparatus 16. The air stripper apparatus includes a stripper base 66 with an air inlet 18 through which air is drawn (e.g., 250 cfm or less—"cfm" as it appears throughout this application refers to standard cubic feet per minute) from the environment by virtue of pressure differential created by a vacuum pump 20 (e.g., 3–5 HP), and creates a stripper airstream which flows upwardly through a series of stripper trays 30–44 and in countercurrent flow to the contaminated water, simultaneously flowing laterally and downwardly through the stripping apparatus by virtue of gravity as will be further discussed. An advantage of the blower (vacuum pump) arrangement of this preferred embodiment is that air is pulled through the stripper rather than pushed through to create negative pressure within the system, thus inhibiting leakage of contaminated air out and thereby avoiding collection of contaminant gases, e.g., gasoline vapors, at sites where the apparatus is housed indoors or otherwise confined. Additionally, the negative pressure in the system has been found to increase the mass transfer of contaminant species, e.g., volatile hydrocarbons, from the water to the air.

Referring as well to FIG. 2, substantially clean, contaminant-free water 68 collects (via piping 70 that accesses the final tray 44) in a sump 23 (e.g., rotationally molded polyethylene, 3/16 inch wall thickness) in the base 66 at the bottom of the stripper, from which it is discharged by gravity through pipe ducts 22 (e.g., 2 inch diameter) back into the aquifer by means of a recharge gallery 24 (length e.g., 15 feet) at a point remote from depression 13. (A sump pump may be provided). The air exits the stripper 16 carrying high concentrations of contaminants stripped from the water, passes through mist eliminator 60 (FIG. 2) in capping piece (cap member) 62 and through the outlet 17 to pipe ducts 26 (e.g., 3 inch diameter). A pressure gauge 120 is provided to measure the pressure in the stripper. The contaminated air is introduced by blower 20, whose intake is connected to the top of the stripper at 64 to an air decontamination device 27 which may be, e.g., an oxidative unit or an adsorbent packing to remove the contaminants from the airstream prior to exhausting the air to the atmosphere through exhaust pipe 28. (In other instances it may be permissible to discharge the gaseous effluent directly to the atmosphere through an exhaust stack.)

The air decontamination device is preferably an oxidation unit of relatively small size (e.g., 8 by 5 by 7 feet high). Heated, VOC-carrying air flows upwardly from a preheater into a catalytic converter containing a catalyst, e.g., a steel screen rolled into a cylinder, coated with platinum, 3.25 inches high and 12 inches in diameter, as manufactured by Johnson-Matthey, through which contaminant carrying air is caused to flow for conversion of the contaminant molecules into carbon dioxide and water. The catalyst is encased in insulation, e.g., Intrim ® nonasbestos wrapping, manufactured by 3M of Minneapolis, Minn., to contain the heat of reaction and to prevent the contaminant carrying air from flowing around the catalyst. Optionally, the hot air, now essentially free of contaminants, flows through a duct into a heat exchanger for transfer of heat from the hot, now clean air into the contaminated air from the stripper stage. A suitable oxidation system is described in U.S. Pat. No. 4,892,664, assigned to the assignee of the present application and hereby incorporated by reference.

The tray units axe constructed to be easily assembled and disassembled to tailor the stripping apparatus to the specific needs of the site under remediation and enable simple breakdown for transportation from site to site and ease of servicing on-site. The system can be assembled by a minimum number of workers. The small lightweight stages can be carried and assembled by a single worker. Each tray weighs, typically, about 30 lbs and has an area of less than 1000 in$^2$. The stripper trays are individually demountable by means of an interlocking mechanism incorporated in the tray frame 72 which firmly seals each tray to an adjacent tray (by means of seal members discussed further below). The trays are held together by means of two cloth straps 95, 96, the ends of which extend from hooks 97 engaging eye bolts 98 on the base 66 (FIG. 1a). The straps are released and tightened by a tie down ratchet 99. The low physical profile, i.e., height, enables the device to be easily adapted for various water remediation requirements by the addition of more or fewer trays. In the embodiments particularly discussed herein, it has been found that two successive trays have a removal efficiency of about 90%. Typically, six to ten trays are employed. In an eight tray system as illustrated, decontamination levels of 99.99% are achievable. Further, cleaning and replacement of e.g. the mist eliminator 60 or the tray bottoms 46 may be accomplished by workers laboring at relatively low heights above the ground.

The low physical profile, typically a stripper tower height of about eight or nine feet, overall, also satisfies aesthetic requirements of outdoor sites such as at filling stations located in residential areas. The entire remediation apparatus, including the stripper apparatus can be conveniently housed in a room or hidden behind a single story building. Referring to FIG. 2, in the embodiment shown, the overall height of the stripper apparatus 16 is $H_1$, under 8.0 feet, the overall height of the stages being $H_2$ about 4.5 feet, the height of the base 66 being $H_3$ about 2.0 feet, the height of the capping piece 62, being $H_4$, about 0.5 feet and the height of each stage being $H_5$ about 0.5 feet.

Figure 2A:
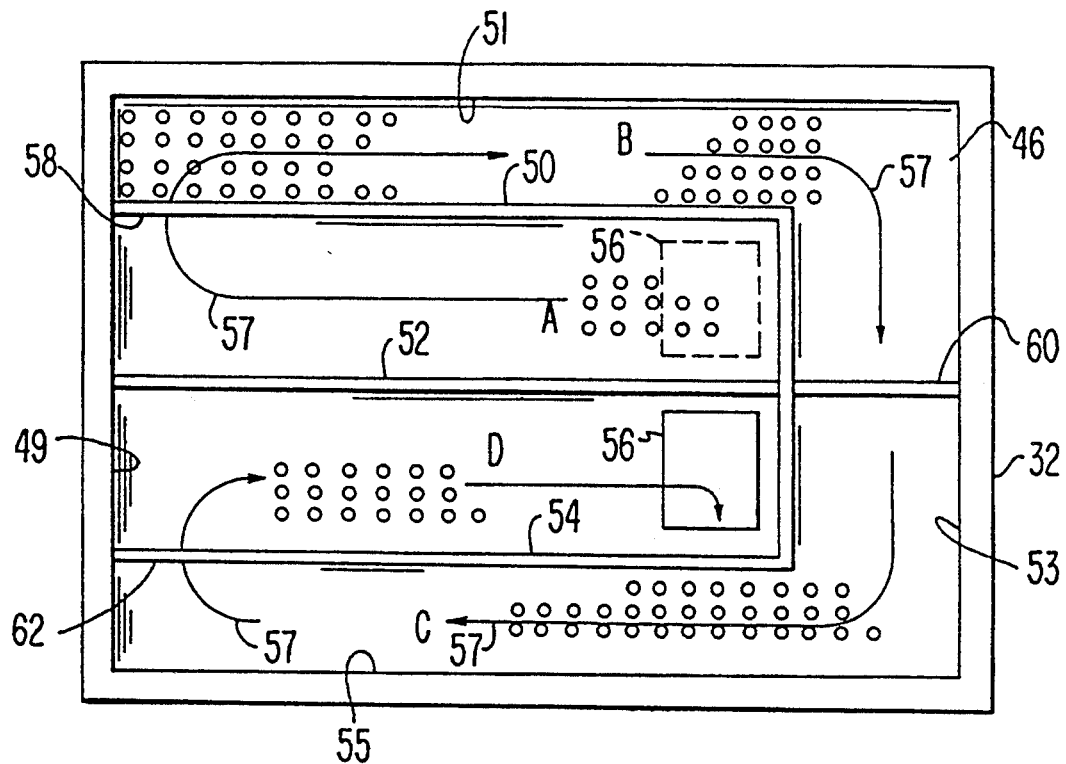
FIG. 2a is a cross-sectional view along the lines a—a in FIG. 2, illustrating the lateral flow of water.

Referring as well to FIG. 2a, the low profile stripper apparatus tray units 30-44 are arranged to direct the flow of contaminated water and stripper air in a manner that optimizes efficiency of the stripping process by direction and control of water and air flow. The effectiveness of the stripper reduces requirements for air volume, thus reducing required pumping capacity of the air blower or vacuum pump 20 and the decontamination capacity of the decontamination device 27, both factors contributing to the reduced physical profile and energy requirements of the overall system. Each tray is separated from the tray immediately below by an air-porous tray bottom member 46 which has a plurality of apertures 48 sized and configured such that water may be flowed thereover without seepage of the water through the apertures even under conditions of substantially zero air flow through the apertures. Preferably, the apertures are circular in shape and of a diameter of less than 0.100 inch, most preferably about 0.050 inch and are spaced to provide an open area of less than about 20%, typically, 2 or 3 to 8 or 9%, and preferably 4 or 5%. The percent open area can be selected based on the desired flow rate. Also, with smaller apertures, generally smaller bubbles are formed in the water treated, enhancing surface contact and generally providing greater stripping efficiency. The tray bottom is preferably formed of an economical, thin, flexible material, e.g. stainless steel, or suitable plastic that resists fouling and may be disposed of after use.

Figure 2B:
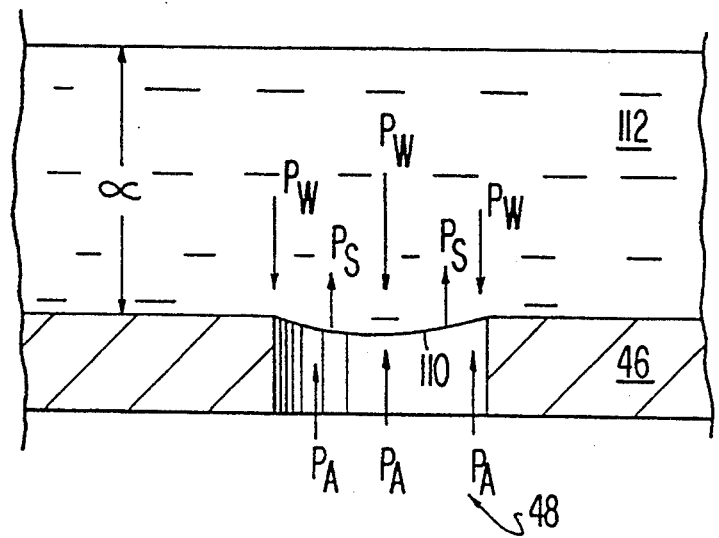
FIG. 2b illustrates an air permeable medium that prevents the flow of water therethrough at zero air flow.

Referring to FIG. 2b, a greatly enlarged view of a portion of a tray bottom 46, having air apertures 48 is shown. The water at an aperture forms a meniscus 110 which bears the load exerted by water pressure $P_w$ from the depth d of the water 112 above. The meniscus resists passage of water through the aperture because of the combined effects of surface tension $P_s$ in the meniscus and the positive pressure of the air $P_a$ (the differential between the air pressure below the aperture and the air pressure above the water head) acting across the stage from below. These act to oppose the effects of $P_w$. By sizing the aperture below a critical limit, e.g., below about 0.100 inch in practical systems, the contribution of the surface tension, $P_s$ and the air pressure $P_a$ prevent the flow of water down through the hole, preserving the meniscus, under conditions of zero air flow through the aperture. By thus limiting the size of the apertures, it becomes possible to selectively limit the amount of air flow used to the minimum required to remove the contaminants in water. In this way the air flow required may be minimized, in turn minimizing the quantity of contaminated air that must be post-treated. Furthermore, the range of air flows is controllable over a wide range, e.g., of 20 to 1. In practical systems, the actual size of the apertures may be selected based on, e.g., the surface tension of the contaminated water, the depth of the water in the stage and the desired air flow rate.

The trays include baffles 50, 52, 54 which with tray walls 49, 51, 53, 55 form a series of compartments, labelled A, B, C, D, to direct the lateral flow of contaminated water about the tray, as illustrated particularly in FIG. 2a by arrows 57 and limit mixing of the vertical flow of air between corresponding columns labeled A', B', C', D', as indicated particularly in FIG. 2 by arrows 57. Referring first to FIG. 2a, the water, typically about 1–2 inches deep in any tray, is introduced by a transfer duct 56 which directs water from compartment D from a previous tray into compartment A of the next adjacent tray below (arrow 90, FIG. 2). Within each tray, the water flows in a relatively narrowly confined flow from compartment A, through baffle aperture 58 to compartment B, next through baffle aperture 60 to compartment C, and finally through baffle aperture 62 to compartment D, followed by removal of the water laterally through a transfer duct 56 to compartment A of the next tray below. As the water follows this circuitous path, stripper air continuously bubbles 61 (FIG. 2) through the small apertures 48 to remove contaminants from the water by air stripping. The lateral flow path provides a desired duration residence time of water within the stage and enhances stripping efficiency without increasing stripper vertical height. Within each stage the contaminated water becomes progressively less contaminated as it passes progressively through compartments A, B, C, and D since the residence time, i.e. degree of exposure to the stripper air, increases. Similarly, the water in each tray is successively cleaner than the tray above.

The air flow passes vertically upward through the stages. In any given stage, the air above the water is progressively less contaminated as a function of lateral position within the tray, in the same direction that the water becomes progressively cleaner flowing laterally through the tray. Referring to FIG. 2, the baffles 50, 52, 54 of each tray are aligned to separate the vertical flow of air into columns A'–D', corresponding to the chambers A–D of the trays. In this arrangement, the baffles do not interfere or deflect the vertical flow of air and further serve to stabilize vertical flow and minimize the mixing of air flow from adjacent lateral positions in the tray. It will be appreciated, therefore, that in each column, the flow of air is substantially vertical, such that the air from the previous stage contacts the water in the next stage at the same lateral position. The L-shaped transfer duct 56 assures that water is introduced to each successive tray at a point directly below the introduction point of the previous tray. This configuration has the particular benefit of enhancing mass transfer of contaminant species from the contaminated water to the stripper air by providing a substantially consistent ratio of contamination concentration of the air above the water to the equilibrium contamination of the water. That is, for example, in the instance of column D', the relatively cleanest air passes through and is mixed with the cleanest water in each tray, i.e., the water in tray compartment D. Similarly, the most contaminated air is that passing through column A', since it is this column that is exposed to the most contaminated water of each stage, that in compartment A.

Figure 3:
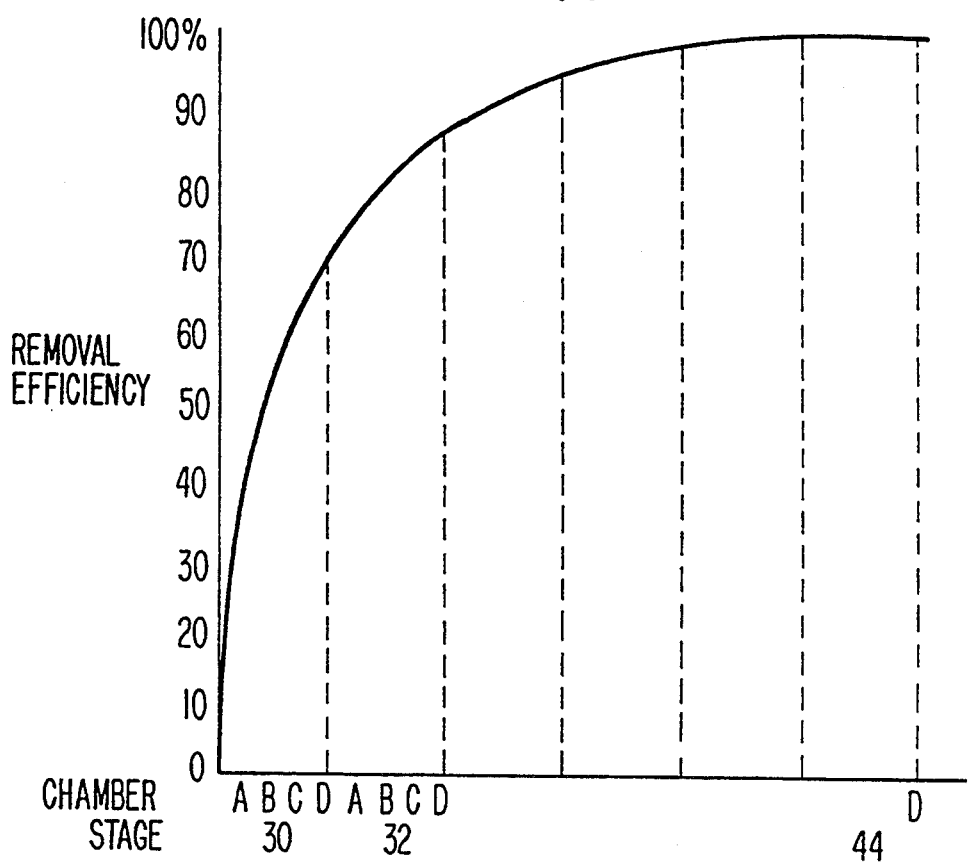
FIG. 3 is a plot of the relative contaminant removal efficiency versus vertical stage for a water stream under treatment.
Figure 3A:
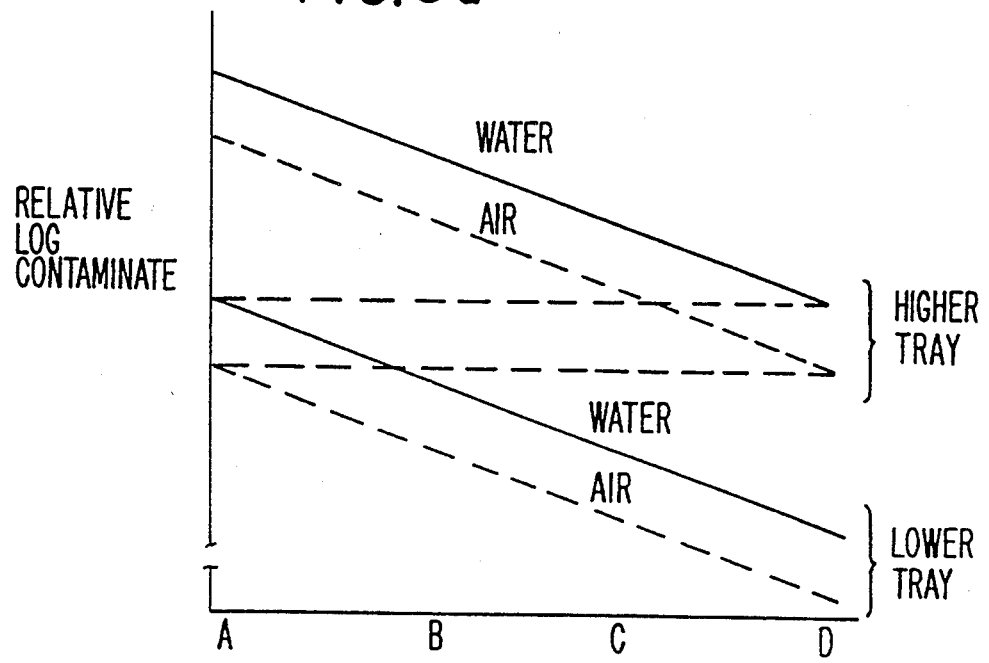
FIG. 3a is a plot of relative logarithmic contaminant concentration of water and air as a function of lateral position in a treatment tray.

Referring to FIG. 3, the relative contaminant concentration verses tray chamber and vertical stage is illustrated for contaminated water in the stripper. As the plot indicates, the water becomes progressively less contaminated as it flows laterally in each tray from chambers A–D and as it passes downward through the stripper from stages 30 to 44, resulting in a concentration gradient laterally and vertically and substantially contaminant-free water at chamber D of stage 14. Referring now to FIG. 3a, the contamination of water and air is shown as a function of lateral position within a tray for two adjacent trays, a lower tray and an adjacent higher tray (representative of trays above the bottommost tray). As illustrated, both water and air are progressively less contaminated, progressing laterally between compartment A to D. Because air is mixed with water at the same lateral location of each vertical tray, the difference in relative contaminant concentration between water and air remains substantially constant, or at least generally consistent, from tray to tray for the same lateral position.

Manufacture

Referring now to FIGS. 4–4c and 5–5b, each tray is separated from adjacent trays by an air permeable tray bottom 46, e.g., of rectangular shape having a length $L_1$, about 24 inch and width $w_1$, about 20 inch. The tray bottom is preferably formed of 20 gauge 304 stainless steel ($T_1$, about 0.036 inch) or punctured or molded plastic and includes apertures of $d_1$, about 0.050 inch spaced $S_2$, about ¼ inch on center (FIG. 4a). An exit aperture 74 (3.5 inch by 2.375 inch) is provided at a position corresponding to tray compartment D enabling the flow of water treated in each tray to pass through transfer duct 56 to compartment A of the next tray.

The transfer duct 56 is constructed of stainless steel or molded plastic and includes an inlet aperture 76 and outlet aperture 78 for transporting water laterally to the stage below at a point directly below the introduction of the previous stage (FIG. 4b). The transfer duct 56 includes a one-way check valve, with a valve plate 88, which may travel in a radial fashion along ring member 89 such that, during star up, the vertical flow of water in the direction of arrow 90 is permitted for passage of water between adjacent stages but flow of air in opposite direction to the arrow 90 is prevented. The valve thus prevents large quantities of air from passing through the stripper during system start up when little or no water is present in the tray to provide a water lock to the normally-submerged outlet of the transfer duct. As evident, the transfer duct prevents the vertical flow of air upward through a small portion of compartments A and D where introduction and removal of water from the trays takes place. The transfer duct 56 is fixed to the tray bottom 46 by means of screws 79 and sealed with a neoprene 1/16 inch thick gasket 80. Transfer duct 56 is seated on a ledge 59 cut in the baffle 52 of the troy.

The baffles 50, 52, 54 and baffle wall piece 81 are positioned in a tray body 82 and secured, e.g., by press fit or ultrasonic welding. The troy body 82 has a width $W_2$, about 28 inch, and length $l_2$, about 32 inch and, as discussed, a height $H_5$ about 6 inch. The overall area of the stripper stage is thus less than about 900 in$^2$. The body 82 includes a ledge 84 upon which rests the troy bottom 46.

Referring to FIG. 5, for interlocking adjacent trays, a frame gasket 86 (lower frame gasket shown in FIG. 4) is seated in a cut-out 100 of the lower portion of the body and a protuberance 102 on the upper portion of the body fits therein to form a sealing engagement when the trays are placed under compression (e.g., by straps 95, 96, FIG. 1a). A baffle gasket 83 formed of neoprene, seats on the edges of the baffles 50, 52, 54 (polyethylene, ¼ inch thick) (FIG. 4c). The baffle gasket has a U-shaped configuration, with baffles 50, 52, 54 fitting within the U and the back of the U resting against the tray bottom 46, as illustrated in FIGS. 5–5b. The structure thus permits sealed separation between the vertical columns and structural support for the tray bottoms.

Use

The system is particularly useful for decontamination of water contaminated with volatile organic compounds (VOC) which may be introduced to Found water through leakage of a storage tank or the like, as illustrated in FIG. 1. A typical example is a gas station from which VOCs have leaked into the groundwater. Chemical species that make up the contamination include gasoline components, e.g., MTBE (methyl tert-butyl ether) and the BTEX compounds (benzene, toluene, ethyl benzene and xylenes) as well as other water insoluble, high vapor pressure compounds. It will be understood, that the system may be used otherwise, e.g., for remediation of water contaminated with typical dry cleaning chemicals such as chlorinated hydrocarbons and the like, or other volatiles such as ammonia or H2S. Typically, even contaminant chemicals which are substantially insoluble with water dissolve into the water in relatively low concentrations (about 1% or less) that nevertheless prevent many uses of the water, e.g., as drinking water. At the contamination site, the degree and type of contamination is preliminarily determined by sampling the groundwater from which analysis the initial configuration and operating conditions of the remediation system of the invention can be determined. These conditions include, in particular, the size and percent open area of the apertures in the tray bottoms, which must be selected based on the surface tension of the contaminated water. The tray bottom in successive trays can be optimized based on the variation in surface tension effected by the removal of contaminants of the water at successive trays, or for dealing with potential fouling contaminants. For example, the size of the openings may decrease from the top stage toward the bottom stage with the larger openings near the higher stages receiving the deposits thus effectively serving to filter the water for the lower stages. The number of stages required is also determined from the initial analysis. The remediation system, easily broken down into stages, is transported to the site and constructed. By virtue of the modular design and low profile, assembly may be easily performed by one man without working at great heights. The air decontamination capacity and mode is also selected based on the initial analysis. The low physical profile of the apparatus does not generally adversely affect the aesthetics of the site. If desired, the apparatus may be housed in a single story building.

During the course of remediation, the progress of the decontamination and the proper operation of the system may be monitored periodically by a single maintenance worker. The pressure, measured, e.g., at the top of the stripper unit, can be read as an indication of fouling of the air permeable trays. The worker can also easily remove the trays to visually check for fouling and perform cleaning. Replacement of the porous bottoms can be effected at low cost, as needed. The system can be varied to maximize efficiency. For example, variations in contamination level may dictate providing fewer or more stages, ,which can be easily inserted or removed from the stripper tower. Likewise, the tower may be easily serviced, e.g., tray bottoms may easily be cleaned or replaced in the case of blockage of the apertures due to sediments or hard water deposits. Air flow can be adjusted over a wide range.

Other Embodiments

It will be understood that many variations are possible. For example, where as rectangular trays are illustrated in the embodiments described herein, other shapes, e.g., circular cross-section trays may be advantageously employed. Likewise, the tray bottoms can be formed of various material, particularly resistant to specific chemical contaminants found on site. For example, the tray bottoms may be constructed of brass, plastic, etc. Likewise, other components, e.g., the tray body and sump can be formed of various materials such as stainless steel. Automatic ultrasonic self-cleaning may be incorporated. The low profile of the system enables its construction and use at spills occurring in an indoor setting. The stripper unit may be used without a vapor de, contamination system by exhausting the airstream directly into the atmosphere, preferably through an exhaust duct extending to sufficient height so as to expel the airstream at sufficient height to avoid collection of contaminants at low levels. The blower may be arranged at a position upstream of the stripper unit. The apparatus may be mounted on a trailer or flat bed for ease of transport. The system may be configured for remote monitoring. The system may be sized for various capacities, e.g., for water flow rates of greater than 20 gpm. Various configurations of aperture sizes in successive stages can be used. For example, the top two trays may include tray bottoms with apertures larger than the stages below, to enhance faltering of deposits, or the upper apertures may be smaller, in the upper stages than the lower stages in cases where the surface tension of the water increases as the water is decontaminated.

FIGS. 6-10 illustrate a particular alternative embodiment of the invention which will now be described.

Figure 6:
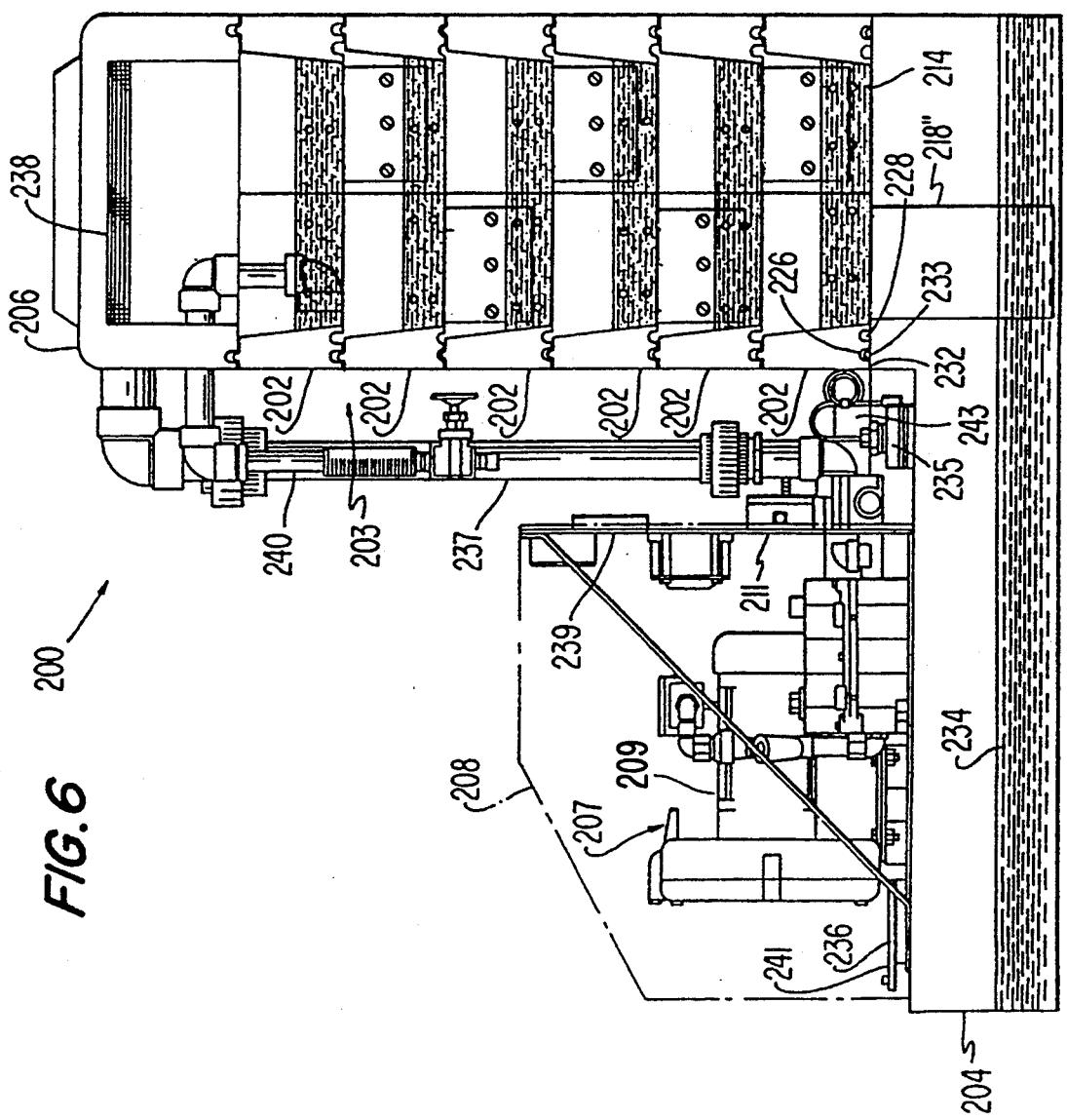
FIG. 6 is a side-view, partially in cross-section, of a low physical profile air stripper system in accordance with an alternative embodiment of the invention.
Figure 7:
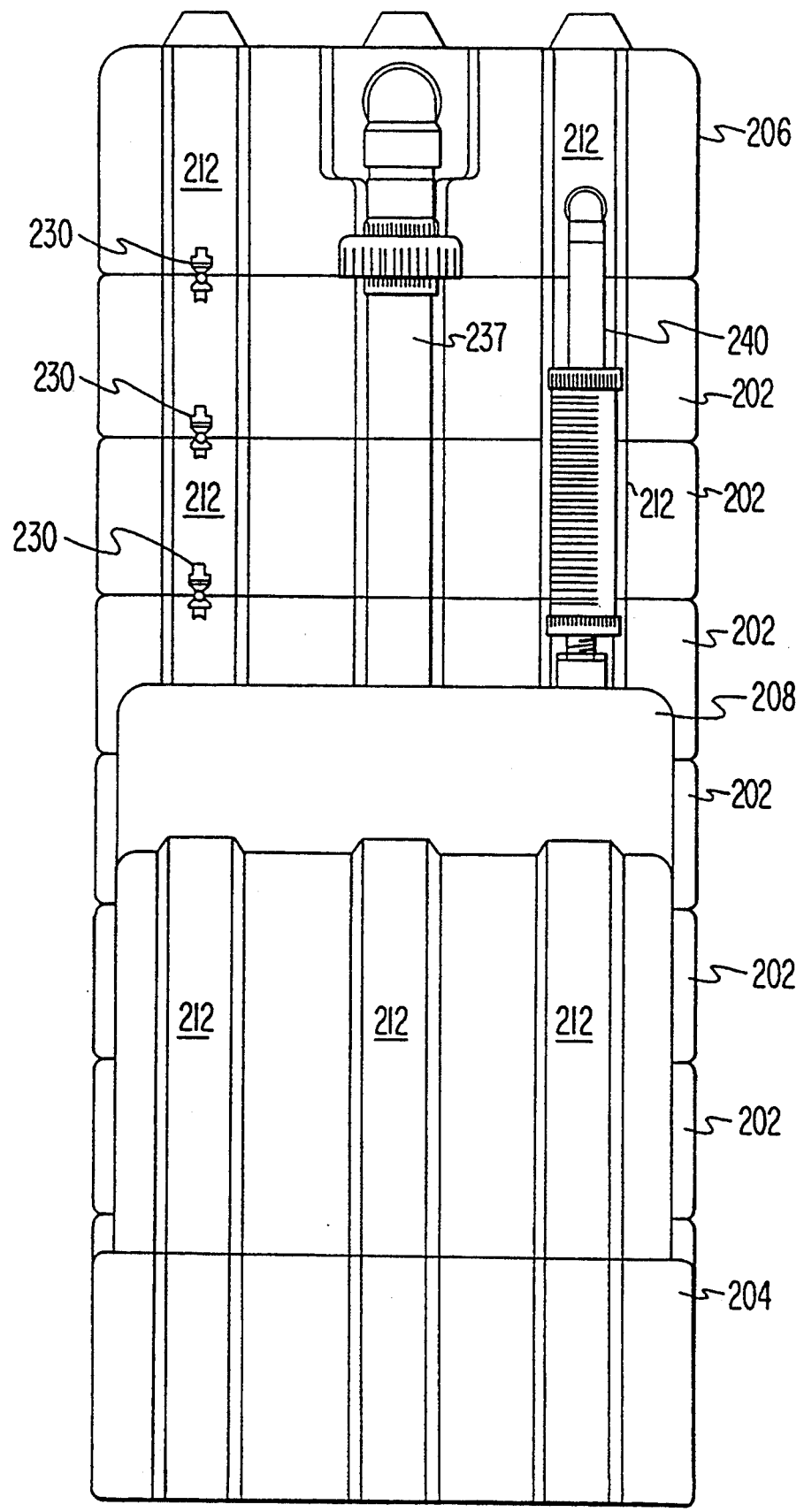
FIG. 7 is a frontal view of the stripper system illustrated in FIG. 6.

The embodiment illustrated in FIGS. 6-10 provides, like the embodiment shown in the preceding figures, a modular, portable system for air stripping contaminants from water, e.g., ground water, at a remediation site. Referring to FIG. 6, stripping system 200 comprises a plurality of interchangeable demountable tray units 202 stackable one on top of another in a sealed manner to form a stripping column 203. Lowermost tray unit 202 is sealably secured to sump 204, whereas uppermost tray unit 202 is attached to sealing cap member 206. Mounted directly on sump 204 is a vacuum pump assembly 207 comprising a vacuum pump 209 and a diagonally braced L-shaped metal mounting bracket 211. A vacuum pump enclosure 208 (having an open bottom and side) covers vacuum pump 209 and is secured to sump 204 and mounting bracket 211. Vacuum pump enclosure 208 serves to protect vacuum pump 207 from damage, e.g., from the elements and during transportation of system 200, and allows for cooling of the pump as will be described hereinafter.

Figure 8:
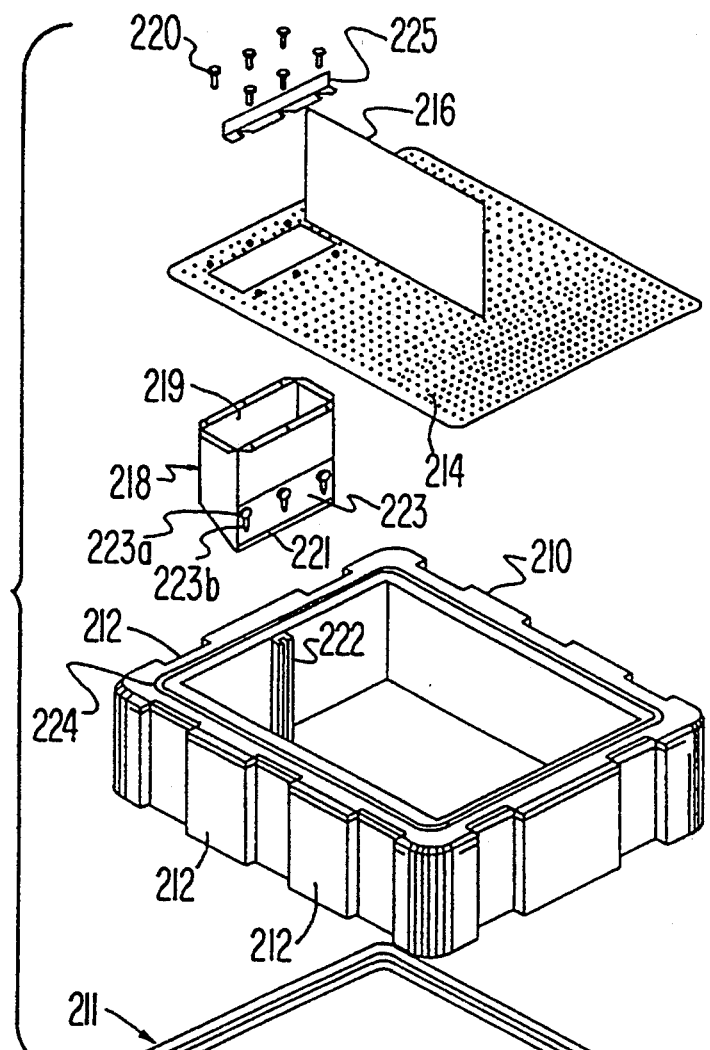
FIG. 8 is an exploded view of the tray unit employed in the stripper system of FIGS. 6 and 7.

As in the first embodiment, tray units 202 comprise hollow, lightweight rotationally molded peripheral frames 210 (separately labelled in FIGS. 8-10). Likewise, sump 204 and cap member 206 preferably comprise hollow rotationally molded plastic (e.g., polyethylene) pieces. Enclosure 208 is preferably formed of rotationally molded plastic as well. Spaced aligned vertical ribs 212 are preferably provided on each rotationally molded component for added structural rigidity and ease of handling.

Each frame 210 removably retains on its upper periphery a substantially horizontally oriented sheet member 214 formed of plastic or stainless steel and provided with a plurality of small apertures (perforated area), as in the first embodiment. Frames 210 should have a height sufficient to separate adjacent sheet members 214 from each other to prevent entrainment of water through the sheet members 214 due to froth formation and hurled water droplets generated in the tray units 202 by the stripping air during operation. Practice has shown that for water flow rates of up to 8 gpm, a 7 in. height tray is sufficient. For water flow rates above 8 gpm and up to 20 gpm, a 10 in. height tray is more suitable.

Stripping system 200 provides a simplified water flow path as compared with the embodiment of FIGS. 1–5. A single baffle plate 216 per tray creates a generally U-shaped lateral flow path across each tray. Baffle plate 216 is secured to sheet member 214 (e.g., by spot welding in the case that sheet 214 is made of stainless steel) and is fitted within a U-shaped slot 222 provided in frame 210.

Secured to the undersurface of all but the lowermost of sheet member 214 (e.g., by screws 220) is a simplified water transfer duct (downcomer) 218 (which may be constructed of stainless steel) to transfer water to a next lower tray unit 202. Transfer duct has a completely open rectangular inlet 219 and an outlet in the form of a slot 221 extending across a side face of transfer duct 218. The width of outlet slot 221 is adjustable by virtue of plate 223 which is movable vertically and securable by screws 223a extending through slots 223b (only one pair labelled) provided in plate 223. By adjustment of the width of slot 221, a wide range of water flow rates can be accommodated, while minimizing air flow through the transfer ducts 218, especially in a start-up condition. By placing outlet slot 221 on a side face of the transfer duct and providing a bottom surface converging toward slot 221, water is transferred smoothly from an upper to lower tray unit 202. Also secured to sheet member 214 in front of transfer duct inlet 219 (e.g., by screws 220) is a weir 225 which determines the quiescent depth of water in tray units 202, and influences the froth height in tray units 202 in operation of system 200.

Figure 8A:
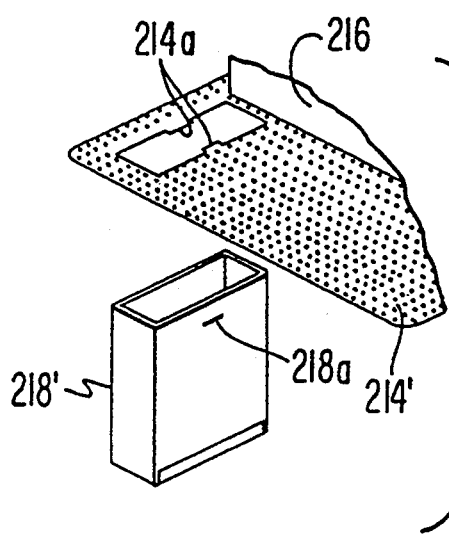
FIG. 8a is a partial exploded view showing an alternative preferred design for a water transfer duct.

An alternative transfer duct arrangement is illustrated in FIG. 8a. In this design, tabs 214a on sheet member 214' engage slots 218a provided in rectangular transfer duct 218' which conveniently may be formed of molded or extruded plastic material. A portion of transfer duct 218' extending above the surface of sheet 214' is sized to correspond to the desired water depth and froth height in trays 202. Thereby, the need for a separate weir structure is avoided. A plastic molded or extruded construction avoids a weld seam of a stainless steel transfer duct which may allow stripping air to leak into the transfer ducts, undesirably allowing the air to bypass the small apertures in sheets 214.

A transfer duct 218" attached to lowermost sheet member 214 (see FIG. 6) may be constructed generally like ducts 218, 218' described above. However, duct 218" should be long enough to extend almost to the bottom of sump 204 so as to remain submerged in water 234 (to avoid air flow therethrough). Also, the bottom of duct 218" may be left completely open to provide a simple water outlet.

Hollow frames 210 are designed to provide a dual gasket arrangement 211 for ensuring a tight seal (1) between adjacent trays 202 assembled one on top of the other and (2) between each sheet member 214 and its surrounding frame 210. Around the upper peripheral surface of each tray 210 extends a rib-like protuberance 224 which mates with a corresponding outer recess 226 provided in the bottom peripheral surface of each frame 210. Gasket material 226a fills recess 226 and becomes compressed by protuberance 224 when multiple trays are assembled, in order to provide a tight sealing engagement of adjacent tray units 202. A second inner recess 228 is filled with gasket material 228a which abuts against a top peripheral portion of a sheet member 214 resting on an inner peripheral ledge 229 of a lower frame 210 when the tray units are assembled, in order to provide a tight seal between sheet members 214 and frames 210 such that air cannot bypass the small apertures in sheet members 214. A suitable gasket material is EPDM, an ethylene propylene polymer, which may be separately formed with a generally cylindrical cross-section (e.g., ⅛ in. diameter) and cemented in recesses 226, 228.

Whereas in the first illustrated embodiment a strap and tie down arrangement is used to secure the stacked tray units to each other, the sump and the cap member, system 200 utilizes individual fasteners associated with each tray 202, sump 204 and cap member 206, e.g., stainless steel latches 230 (see FIG. 7) to fasten these components together. A plurality of fasteners, e.g., ten, are spaced about the periphery of each frame 210 in order to apply a substantially uniform compressive pressure about peripheral mating surfaces of the frames 210. Mating latch components are preferably positioned as closely as possible to the mating surfaces of each frame 210, sump 204 and cap member 206. This minimizes the amount of plastic material put under compression which in turn results in minimized distortion of the stripper components and hence increased seal integrity.

Sump 204 provides a base upon which stripping column 203 formed of stackable tray units 202 and cap member 206 is mounted. As best seen in FIG. 6, a mounting surface 232 for lowermost tray unit 202 is provided on a slightly raised platform of sump 204. Mounting surface 232 has, like the top of each frame 210, a rib-like protuberance 233 for mating engagement with the gasket material in outer gasket recess 226 of lowermost tray unit 202, and a flat ledge surface on which a lowermost sheet member 214 may rest and sealably engage with the gasket material in inner recess 228.

As in the first illustrated embodiment, sump 204 allows for temporary storage of decontaminated water 234 passed through stripping column 203. As described in connection with the first embodiment, this water can be directed to flow from sump 204 back into the ground via piping 22 and recharge gallery 24 (see FIG. 1), or to any other predetermined storage location. Preferably, sump 204 is equipped with a sump probe assembly 235 for sensing the water level in the sump, whereby operation of a pump for removing water from the sump can be controlled and/or the system can be automatically shut down if a malfunction causes the sump to fill to an unacceptably high level.

Sump 204 is also provided with an air inlet 236 through which air is drawn into the stripping column 203. In particular, the inlet of vacuum pump 207 communicates via piping 237 with the inside of cap member 206 through a mist eliminator 238, similar to mist eliminator 60 in the first illustrated embodiment. The vacuum generated by pump 207 draws air through inlet 236 into sump 204 and up through the perforated sheets 214 of each tray unit 202 in order to perform the stripping action by a countercurrent flow of water and air as water flows laterally across and downwardly through the stacked tray units 202 in a sequential manner. Air inlet 236 may be provided with a known type of adjustable air flow regular or restrictor 241 for increasing the negative pressure caused within stripping column 203 by vacuum pump 207 in order to enhance the volatization of contaminants in the water.

Enclosure 208 covers air inlet 236 as well as pump 207, and L-shaped bracket 211 is provided with a passageway 239 which allows air to flow into the enclosure and through inlet 236 during operation of the system. Vacuum pump or blower 207 is cooled by the flow of air thereacross within enclosure 208. Further, this arrangement advantageously may provide slight heating of the stripping air which should facilitate water to air transfer of volatile contaminants. Passageway 239 has a flanged connector to allow for connection of a conduit which may, e.g., lead to the outdoors in the event system 200 is set up in a climate controlled building, whereby building heating or cooling losses due to operation of the system are avoided. Passageway 239 is also preferably screened or filtered to avoid the introduction of foreign matter into the system. Contaminated air is exhausted from pump 207 through a conduit 243 extending through L-shaped bracket 211 and to an appropriate stack or air decontamination device (e.g., 27 as shown in FIG. 1 )

Figure 10A:
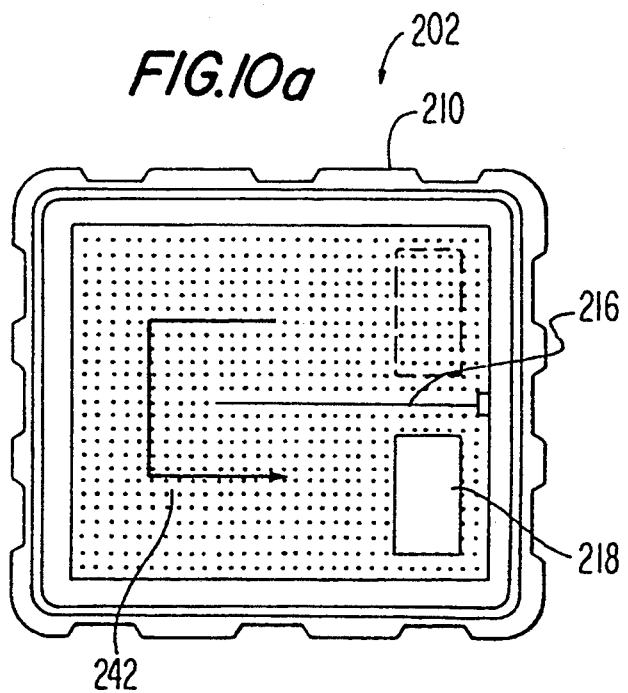
FIGS. 10a and 10b are plan views of adjacent tray units which would be placed one above the other, illustrating the opposite flow paths of water across adjacent trays.
Figure 10B:
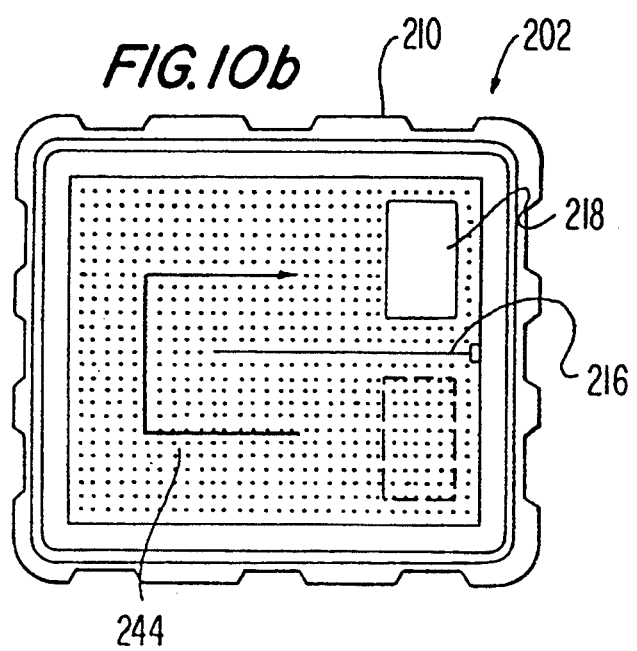

The water and air flows within stripping column 203 are now described in further detail. Contaminated water enters the top tray 202 via piping 240 extending through cap member 206. The water takes, within the top tray, a U-shaped path across the perforated area of the sheet member 214 as illustrated by arrow 242 in FIG. 10a. The water then drops through transfer duct (downcomer) 218 directly downwardly onto the sheet member 214 of a next lower tray, having a transfer duct 218 mounted on an opposite side of baffle plate 216, as shown in FIG. 10b. In this lower tray the water follows a reverse U-shaped path as shown by arrow 244. The direction of water flow thus alternates between clockwise and counter-clockwise directions from tray to tray. Practice has shown that excellent de, contamination efficiencies can be obtained with the simplified construction, whereby manufacturing and maintenance costs can be reduced.

EXAMPLE

A stripping system in accordance with the embodiment of FIGS. 6–10 has been constructed and tested as follows. Each tray unit 202 was provided with a sheet 214 formed of stainless steel and having regularly spaced circular apertures with a diameter of 0.047 in. providing an open area of between 4 and 5% of a total sheet area of 480 in$^2$ (sheets 214 measured 24 in.$\times$20 in., with the tray frames 210 measuring overall, 23 in. in width, 27 in. in length and either 7 or 10 inches in height). Transfer ducts 218 extended above sheets 214 to create a weir height (equal to quiescent water depth on trays) of 1 in. The open top of each transfer duct measured 3.0 in.$\times$7.75 in. and a $\frac{3}{8}'$ in. widthwise slot was provided at the bottom of each transfer duct. So constructed, with a stripping column 203 comprising 6 trays, a water flow rate from several to 10 gpm, and an air flow rate in the range of 100 to 175 CFM, decontamination levels of between 99.90 and 99.99% were obtained for feed water contaminated with the four BTEX compounds. Comparable decontamination levels are obtainable for water flow rates of up to 20 gpm with airflow rates up to 250 CFM. Furthermore, it is believed that MTBE is removable from water with similar efficiencies. Finally, higher efficiencies are generally obtainable by adding additional tray units 202 to stripping column 203.

It can thus be seen that very high de, contamination levels are obtainable with a relatively low air flow rate (thereby reducing the significant costs involved in subsequently treating the stripper air) and with an unobtrusive, easy to transport, assemble and service, low profile apparatus. (The overall height of a 6 tray system is 5.5 feet for 7 in. high trays and 7 feet for 10 in. high trays, sump 204 and cap member 206 each measuring 1 ft. in height.)

The invention has been illustrated and described in terms of preferred embodiments thereof. Other embodiments within the scope and spirit of this invention will occur to those having ordinary skill in the art upon reading this disclosure.

We claim:

1. A method of treating contaminated water, comprising the steps of:
   pumping contaminated water to an elevated position;
   directing the water to flow laterally across and downwardly through a series of substantially horizontal trays sealed to each other to form a stripping apparatus;
   flowing air upwardly through said stripping apparatus, while said water flows downwardly from tray to tray through downcomers and laterally across a perforated area of said trays, in such a manner that the air passes through a plurality of apertures of the perforated area having a diameter no greater than 0.100 inch and through the water as it flows laterally across each tray, whereby contaminants in the water are transferred to the air flowing upwardly, with substantially no water seepage through said apertures;
   exhausting air from the stripping apparatus for subsequent treatment; and
   recovering decontaminated water which has passed through the stripping apparatus.

2. A method according to claim 1, wherein the water being decontaminated in groundwater pumped from the group for decontamination and returned to the ground following decontamination.

3. A method according to claim 1, wherein the apertures through which the air is passed have a diameter of less than 0.050 inch.

4. A method according to claim 1, wherein the apertures through which the air is passed provide an open area of each tray of less than 20%.

5. A method according to claim 1, wherein the apertures through which the air is passed provide an open area of each tray of 2% to 9%.

6. A method according to claim 5, wherein the aperatures through which the air is passed provide an open area of each tray of 4% to 5%.

7. A method according to claim 1, wherein the air is pumped through the stripping apparatus at a flow rate no greater than 250 cubic feet per minute and water is passed through the stripping apparatus at up to 20 gallons per minute.

8. A method according to claim 7, wherein the water is passed laterally across and downwardly through a series of no more than eight trays to obtain a decontamination level of at least 99.99%.

9. A method according to claim 7, wherein the water is passed laterally across and downwardly through a series of no more than six trays to obtain a decontamination level of at least 99.90%.

10. A method according to claim 1, wherein the contaminants being removed from the water comprise volatile organic compounds.

11. A method according to claim 10, wherein the contaminants being removed from the water comprise BTEX compounds.

12. A method according to claim 10, wherein the contaminants being removed from the water comprise MTBE.

13. A method according to claim 1, wherein the air is drawn through the stripping apparatus by a vacuum pump which creates a negative pressure within the stripping apparatus.

14. A method according to claim 1, wherein the water is directed to flow across said trays in a substantially U-shaped path, alternately clockwise and counter-clockwise from tray to tray.

15. A method of treating contaminated water, comprising the steps of:
pumping contaminated water to an elevated position;
directing the water to flow laterally across and downwardly through a series of individually demountable substantially horizontal tray units sealed to each other to form a stripping apparatus;
drawing air upwardly through said stripping apparatus using a vacuum pump which creates a negative pressure within the stripping apparatus, while said water flows downwardly from tray unit to tray unit through downcomers and laterally across a perforated area of said tray units, in such a manner that the air passes through a plurality of apertures of the perforated area, whereby contaminants in the water are transferred to the air flowing upwardly;
exhausting air from the stripping apparatus; and
recovering decontaminated water which has passed through the stripping apparatus.

16. A method according to claim 15, wherein the water being decontaminated is groundwater pumped from the ground for decontamination and returned to the ground following decontamination.

17. A water air stripper system usable to treat contaminated water, said water air stripper system being usable with a blower arranged to cause air flow upwardly through a stripper unit as contaminated water flows downwardly through the stripper unit, said water air stripper system comprising:
a vertical assembly of a series of individually demountable tray units, on which the contaminated water flows, mounted above one another to form said stripper unit,
a bottom of each tray unit comprising an air-porous medium defined by a sheet member having air-flow apertures, each tray unit being constructed to retain water for a period of time during stripping action caused by air passing upwardly through the apertures, and including an internal baffle that defines a tortuous water flow path laterally across each tray unit, said baffles extending respectively between, and substantially sealed to, the undersurface of an adjacent upper tray bottom and an upper surface of the tray bottom in which the baffle resides;
water entry means and exit means respectively at top and bottom ends of said water air stripper unit, and water-flow guiding means to guide said water at a relatively shallow depth over the air-porous medium of each tray unit, thence downwards to a next tray unit; and
air inlet and outlet conduits respectively at the bottom and top ends of said stripper unit.

18. The water air stripper system of claim 17 wherein said assembly comprises a vertically-extending interfitting nest of demountable tray frames, each air-porous medium comprising a porous bottom member which is removably held in each frame.

19. The system of claim 18 wherein said water-flow guiding means comprises a transfer duct arranged to guide the least contaminated groundwater of a said tray unit to flow downwards to a position in an adjacent lower tray unit such that the water entering the adjacent lower tray unit will contact the most contaminated air passing through said adjacent lower tray unit.

20. The system of claim 19 in which substantially all said tray units are provided with a said transfer duct.

21. The system of claim 17 wherein patterns of the baffles of the series of tray units are positioned substantially identically above one another to form a vertically arranged series of baffles and the water is guided from tray unit to unit such that the water proceeds progressively in repeated fashion through identical patterns of airstreams as it progressively releases its contaminants during its course of lateral travel through each of the each of the series of units.

22. The system of claim 21 wherein said vertically arranged series of baffles provides adjacent vertical columns for the flow of stripper air, said columns being arranged to maintain, throughout the series of tray units, at any lateral position in the water flow path, a substantially consistent ratio of contamination concentration of the air and the water through which the air passes.

23. The system of claim 17, further comprising a volatilized contaminant removal device connected to receive contaminated air from the stripper unit, and an air blower arranged to cause air flow upwardly through the stripper unit, said volatilized contaminant removal device constructed and arranged to remove volatilized contaminants stripped from said water and carried by said air as said air moves through said stripping unit.

24. The system of claim 23 wherein said volatilized contaminant removal device comprises a preheater and an oxidation unit.

25. The system of claim 23 wherein said volatilized contaminant removal unit comprises at least one of an absorbent and adsorbent.

26. The system of claim 17 wherein said system is constructed to decontaminate water at a flow rate of about 20 gpm.

27. The system of claim 17 wherein said system is constructed for an air flow rate of about 250 CFM or less.

28. The system of claim 17 wherein air is drawn into said stripper unit from a blower or vacuum pump, the intake of which is connected to the top end of said stripper unit.

29. The system of claim 17 further comprising adjustment means for varying an air flow volume through the stripper unit over a range of about 20 to 1.

30. The system of claim 17 wherein said air porous medium is removable and disposable.

31. The system of claim 17 wherein said air-porous medium has openings of about 0.050 inch diameter.

32. The system of claim 17 wherein said air porous medium is a thin, flexible sheet having a thickness of 0.06 inch or less.

33. The system of claim 17 wherein said assembly of tray units is arranged such that the size of said air-flow apertures decreases in successive tray units from the top end of the stripper unit.

34. The system of claim 17 wherein said stripper tray units have an area of less than about 1,000 in$^2$.

35. The system of claim 17 wherein said tray units have peripheral frames formed of rotationally molded plastic.

36. The system of claim 17, wherein said stripper unit further comprises a sump for receiving water passed through said series of tray units.

37. The system according to claim 36, wherein said sump is formed of rotationally molded plastic.

38. The system of claim 17 wherein said stripper tray units have a vertical height of about six inches.

39. The system of claim 38 wherein said stripper unit has a vertical height of about nine feet or less.

40. The system of claim 17 wherein said water air stripper unit comprises at least five of said tray units.

41. The system of claim 40 wherein said air stripper unit comprises six to ten of said tray units.

42. The water air stripper system of claim 17, wherein said apertures have a diameter of about 0.100 inch or less to prevent the flow of water therethrough at substantially zero air flow through the apertures under conditions of equality between a head of water in the tray above the apertures and an opposing pressure differential of the air below and above the tray.

43. A water air stripper unit usable to treat contaminated water at a remediation site, said stripper unit comprising a vertically-extending interfitting nest of demountable tray frames, each tray frame having a porous bottom member which is removable from the frame and an internal baffle that defines a tortuous water flow path laterally across the bottom member of each tray, said baffle extending respectively between and substantially sealed to, an undersurface of the next above tray bottom member and the upper surface of the tray bottom member in which the baffle resides.

44. A liquid remediation apparatus for stripping contaminants from a liquid via air flow, comprising:
a plurality of individually demountable tray units stacked vertically one on top of another to form a stripping unit, each tray unit comprising a sheet member having air-flow apertures, and a baffle that defines a tortuous water flow path across each said tray unit in a lateral direction;
liquid entry and exit means provided at upper and lower ends of said stripping unit, respectively, for providing a liquid flow through said stripping unit; and
air entry and exit means provided at said lower and upper ends, respectively, for providing an air flow through the liquid flowing in said stripping unit;
wherein the baffles of respective stacked tray units are configured one above another such that a plurality of substantially isolated vertical air-flow columns are formed in the stripping unit, whereby air passing from one tray to another tray contacts liquid in said another tray at the same lateral position, and mass transfer of contaminant species from the liquid to the air is enhanced due to a substantially consistent ratio of contamination concentration of the air and the liquid through which the air passes, from tray to tray, within a respective one of said air-flow columns.

45. An apparatus according to claim 44, wherein each tray unit comprises a frame formed of molded plastic material from which said sheet member is removable.

46. An apparatus according to claim 45, further comprising a plastic molded base to which said stripping unit is secured, said base providing air passageways into said vertical air-flow columns and a sump for storage of liquid passed through the stripping unit.

47. An apparatus according to claim 46, wherein said stacked tray units are secured to said base member by a strap and tie down ratchet arrangement.

48. An apparatus according to claim 44, wherein said tray units are shaped so as to securely nest with each other when stacked.

49. An apparatus according to claim 44, wherein said apertures are sized so as to prevent the flow of water therethrough at substantially zero air flow through the apertures under conditions of equality between a head of water in the tray above the apertures and the opposing pressure differential of the air below and above the tray.

50. An apparatus according to claim 44, wherein each said baffle extends respectively between, and is substantially sealed to, an under surface of an adjacent upper tray sheet member and an upper surface of the tray sheet member in which the baffle reside.

51. A liquid remediation apparatus for stripping contaminants from a liquid via air flow, comprising:
a plurality of individually demountable tray units stacked vertically one on top of another to form a stripping unit, each tray unit comprising a sheet member for supporting liquid which flows across said member and having air-flow apertures to allow air to flow upwardly through the stripping unit and through the liquid which flows across each tray unit, and a frame formed of molded plastic material shaped so that said tray units securely nest with each other when stacked to form a fluid tight seal during operation of said apparatus; and
a plastic molded base member to which said stripping unit is secured, said base member providing air passageways into said stripping unit, and a sump for storage of liquid passed through the stripping unit, said stacked tray units being secured to said base member by a strap and tie down ratchet arrangement.

52. A water air stripper system usable to treat contaminated water, said water air stripper system being usable with a blower arranged to cause air flow upwardly through a stripper unit as contaminated water flows downwardly through the stripper unit, said water air stripper system comprising:
a vertical assembly of a series of individually remountable tray units, on which the contaminated water flows, mounted above one another to form said stripper unit, a bottom of each tray unit comprising an air-porous medium defined by a sheet member having air-flow apertures, each tray unit being constructed to retain water for a period of time during stripping action caused by air passing upwardly through the aperatures;

water entry means and exit means respectively at top and bottom ends of said water air stripper unit, and water-flow guiding means to guide said water at a relatively shallow depth over the air-porous medium of each tray unit, thence downwards to a next tray unit, said water-flow guiding means comprising a transfer duct arranged to guide the least contaminated groundwater of a said tray unit to flow downwards to a position in an adjacent lower tray unit such that the water entering the adjacent lower tray unit will contact the most contaminated air passing through said adjacent lower tray unit, said transfer duct including a check valve to prevent air flow therethrough during a start-up condition.

53. A water air stripper system usable to treat contaminated water, said water air stripper system being usable with a blower arranged to cause air flow upwardly through a stripper unit as contaminated water flows downwardly through the stripper unit, said water air stripper system comprising:

a vertical assembly of a series of individually demountable tray units, on which the contaminated water flows, mounted above one another to form said stripper unit;

a bottom of each tray unit comprising an air-porous medium defined by a sheet having air-flow apertures, each tray being constructed to retain water for a period of time during stripping action caused by air passing upwardly through the apertures;

water entry means and exit means respectively at top and bottom ends of said water air stripper unit, and water-flow guiding means to guide said water at a relatively shallow depth over the air-porous medium of each tray unit, thence downwards to a next tray unit; and air inlet and outlet conduits respectively at the bottom and top ends of said stripper unit;

wherein, said water-flow guiding means comprises a transfer duct arranged to guide the least contaminated groundwater of a said tray unit to flow downwards to a position in an adjacent lower tray unit such that the water entering the adjacent lower tray unit will contact the most contaminated air passing through said adjacent lower tray unit, and baffle means are sealed to top and bottom surfaces of successive tray bottoms in a manner to isolate airstreams passing through regions of water in a tray unit that have different levels of contaminants.

54. A water air stripper system usable to treat contaminated water, said water air stripper system being usable with a blower arranged to cause air flow upwardly through a stripper unit as contaminated water flows downwardly through the stripper unit, said water air stripper system comprising:

a vertical assembly of a series of individually demountable tray units, on which the contaminated water flows, mounted above one another to form said stripper unit, a bottom of each tray unit comprising an air-porous medium defined by a sheet member having air-flow apertures, said apertures having a diameter of about 0.100 inch or less to prevent the flow of water therethrough at substantially zero airflow through the apertures under conditions of equality between the head of water in the tray above the apertures and the opposing pressure differential of the air below and above the respective tray, said air-porous medium having an open area of about 2 to 9% of a surface area thereof, each tray being constructed to retain water for a period of time during stripping action caused by air passing upwardly through the apertures;

water entry means and exit means respectively at top and bottom ends of said water air stripper unit, and water-flow guiding means to guide said water at a relatively shallow depth over the air-porous medium of each tray unit, thence downwards to a next tray unit; and air inlet and outlet conduits respectively at the bottom and top ends of said stripper unit.

55. The system of claim 54 wherein said air-porous medium has an open area of about 4 or 5% of a surface area thereof.

56. A water air stripper unit usable to treat contaminated water at a remediation site, said stripper unit comprising:

a vertical assembly of a series of individually demountable tray units, each tray unit having a porous bottom member for allowing air to pass therethrough and water to pass thereover, and an internal baffle that defines a tortuous water flow path laterally across the bottom member; and a transfer duct arranged to guide water from one of said tray units to a next lower tray unit;

wherein:

a plurality of zones of differing air contamination concentrations are set up laterally across each tray unit when water is passed downwardly through the stripper unit and air is passed upwardly through said water; and water being transferred from said one tray unit to said next lower tray unit enters initially a zone of said plurality of zones in said next lower tray unit, having a maximum air contamination concentration, and thereafter flows sequentially into remaining zones of said plurality of zones in an order of decreasing air contamination concentration.

57. A portable modular stripping system usable to treat contaminated water on site, comprising:

a plurality of individually demountable and interchangeable tray units stackable one on top of another to form a stripping column, each tray unit comprising a hollow plastic molded tray frame, a sheet member having air-flow apertures, a baffle defining a lateral water flow path across each sheet member, a transfer duct arranged to guide water through the sheet member after having traversed said lateral water flow path, and sealing means for creating an air and water tight seal between adjacent tray frames when said tray units are stacked to form said stripping column;

water entry and exit means provided at upper and lower ends of said stripping column, respectively, for providing water flow through said stripping column; and air entry and exit means provided at said lower and upper ends, respectively, for providing an air flow through the liquid flowing in said stripping column.

58. A system according to claim 57, wherein said water exit means comprises a hollow plastic molded sump to which a lowermost tray unit is sealably securable, for temporarily storing decontaminated water passed through the stripping column.

59. A system according to claim 58, wherein said sump is formed of rotationally molded plastic.

60. A system according to claim 58, wherein said stripping column further comprises a hollow rotationally molded cap member secured to an uppermost one of said tray units.

61. A system according to claim 58 wherein said sump includes an air inlet through which air is drawn to flow through the stripping column.

62. A system according to claim 61 further comprising a vacuum pump for drawing air through the stripping column and creating a negative pressure therein, and wherein said air inlet has air-flow restricting means for increasing said negative pressure.

63. A system according to claim 58, further comprising a vacuum pump mounted on said sump for drawing air through the stripping column.

64. A system according to claim 63, further comprising enclosure means mounted on said sump for enclosing said vacuum pump and coveting an air inlet in said sump for drawing air from within said enclosure means through said stripping column, said enclosure means having a first passageway for allowing air to enter said enclosure means and a second passageway for exhausting air from said vacuum pump, whereby the air drawn into the stripping column initially passes over and cools the vacuum pump within the enclosure means.

65. A system according to claim 57, wherein said tray frames are formed of rotationally molded plastic.

66. A system according to claim 57, further comprising a vacuum pump for drawing air through the stripping column and creating a negative pressure therein.

67. A system according to claim 66, wherein said air entry means comprises air flow restriction means for increasing the negative pressure created in the stripping column by the vacuum pump.

68. A system according to claim 57, wherein each said tray unit further comprises fastener means for sealably securing adjacent tray units together, one on top of another.

69. A system according to claim 68, wherein said fastener means comprises a plurality of stainless steel latches.

70. A liquid remediation apparatus for stripping contaminants from a liquid via air flow, comprising:

a plurality of individually demountable tray units stackable vertically one on top of another to form a stripping column, each tray unit comprising a sheet member having air-flow apetures, and a baffle defining a lateral water flow path across the sheet member of each said tray unit;

a sump to which a lowermost tray unit may be sealably secured, for temporarily storing decontaminated water passed through the stripping column;

a vacuum pump mounted on said sump for drawing air through the stripping column; and enclosure means mounted on said sump for enclosing said vacuum pump, and coveting an air inlet in said sump for drawing air from within said enclosure means through said stripping column, said enclosure means having a first passageway for allowing air to enter said enclosure means and a second passageway for exhausting air from said vacuum pump, whereby the air drawn into the stripping column initially passes over and cools the vacuum pump within the enclosure means.

71. A portable modular stripping system usable to treat contaminated water on site, comprising:

a plurality of individually demountable and interchangeable tray units stackable one on top of another to form a stripping column, each tray unit comprising a tray frame, a sheet member having air-flow apertures, a baffle defining a lateral water flow path across each sheet member, a transtar duct arranged to guide water through the sheet member after having traversed said lateral water flow path, and sealing means for creating an air and water tight seal between adjacent tray frames when said tray units are stacked to form said stripping column;

water entry and exit means provided at upper and lower ends of said stripping column, respectively, for providing water flow through said stripping column; and air entry and exit means provided at said lower and upper ends, and a vacuum pump in fluid communication with said air exit means, for drawing air through the liquid flowing in said stripping column.

72. A system according to claim 71, wherein said air entry means comprises adjustable air flow restriction means for varying a negative pressure created in the stripping column by the vacuum pump.

* * * * *